US012742292B2

(12) United States Patent
Bernié et al.

(10) Patent No.: US 12,742,292 B2
(45) Date of Patent: Sep. 22, 2026

(54) SYSTEM AND METHOD FOR QUANTIFYING A DEGREE OF FIBRILLATION OF FIBERS WITHIN PULP USING IMAGE PROCESSING

(71) Applicant: Domtar Paper Company, LLC, Fort Mill, SC (US)

(72) Inventors: Jean-Philippe Bernié, Montreal (CA); Harshad Pande, Pointe-Claire (CA); Lindsey Clifton, Fort Mill, SC (US); Alexander Timothy Beam, Fort Mill, SC (US)

(73) Assignee: Domtar Paper Company, LLC, Fort Mill, SC (US)

( * ) Notice: Subject to any disclaimer, the term of this patent is extended or adjusted under 35 U.S.C. 154(b) by 283 days.

(21) Appl. No.: 18/291,553

(22) PCT Filed: Aug. 11, 2022

(86) PCT No.: PCT/US2022/040052
§ 371 (c)(1),
(2) Date: Jan. 23, 2024

(87) PCT Pub. No.: WO2023/027901
PCT Pub. Date: Mar. 2, 2023

(65) Prior Publication Data

US 2024/0344275 A1 Oct. 17, 2024

Related U.S. Application Data

(60) Provisional application No. 63/237,840, filed on Aug. 27, 2021.

(51) Int. Cl.
*G06T 7/00* (2017.01)
*D21H 11/18* (2006.01)
*D21H 23/78* (2006.01)

(52) U.S. Cl.
CPC ............ *D21H 23/78* (2013.01); *D21H 11/18* (2013.01); *G06T 7/0004* (2013.01);
(Continued)

(58) Field of Classification Search
CPC ...... D21H 23/78; D21H 11/18; G06T 7/0004; G06T 2207/10056; G06T 2207/20021; G06T 2207/30161
See application file for complete search history.

(56) References Cited

U.S. PATENT DOCUMENTS

| | | | | |
|---|---|---|---|---|
| 5,786,894 | A | 7/1998 | Shields et al. | |
| 11,788,229 | B2 * | 10/2023 | Kauppinen ............ | D21C 9/007 162/49 |

(Continued)

OTHER PUBLICATIONS

International Search Report and Written Opinion from corresponding International Application No. PCT/US2022/040052 dated Nov. 3, 2022, International Filing Date Aug. 11, 2022.

(Continued)

*Primary Examiner* — Bobbak Safaipour
(74) *Attorney, Agent, or Firm* — TROUTMAN PEPPER LOCKE LLP; Alison L. McCarthy; Celeste K. Walker

(57) ABSTRACT

Aspects of the present disclosure provide systems, methods, and computer-readable storage media that leverage image processing to determine fibrillation within pulp. Size and shape analysis, such as adaptive thresholding and binarization, may be performed on an image of pulp to determine a fiber area of fibers included in the image. Edge detection and morphological image processing may be performed on a plurality of sub-images of the pulp to determine a count of edges of fibrils included in the image and a sum of grey levels associated with the fibrils, respectively. A degree of fibrillation of the pulp may be determined based at least partially on the fiber area, the count of edges, and the sum of grey levels. Local statistical analysis and a Hough trans- (Continued)

form may be used to improve accuracy of the degree of fibrillation or to distinguish fibers from fibril clusters and fibrils within the image.

19 Claims, 8 Drawing Sheets

(52) U.S. Cl.
CPC ............... *G06T 2207/10056* (2013.01); *G06T 2207/20021* (2013.01); *G06T 2207/30161* (2013.01)

(56) References Cited

U.S. PATENT DOCUMENTS

2005/0266147 A1 12/2005 Yao et al.
2009/0279778 A1* 11/2009 Ekin ......................... G06T 7/12 382/170
2010/0220927 A1* 9/2010 Kim ..................... G06V 10/758 382/170
2011/0157177 A1 6/2011 Chen et al.
2015/0213301 A1* 7/2015 Zhao .................... G06V 20/695 382/133
2020/0347551 A1 11/2020 Kauppinen
2025/0295527 A1* 9/2025 Savory .................. A61F 2/0077

OTHER PUBLICATIONS

Pourdeyhimi, et al., “Measuring Fiber Orientation in Nonwovens: The Hough Transform,” Textile Research Journal, Sep. 2002, vol. 72, Issue 9, pp. 803-809, https://journals.sagepub.com/doi/abs/10.1177/004051750207200909.

* cited by examiner

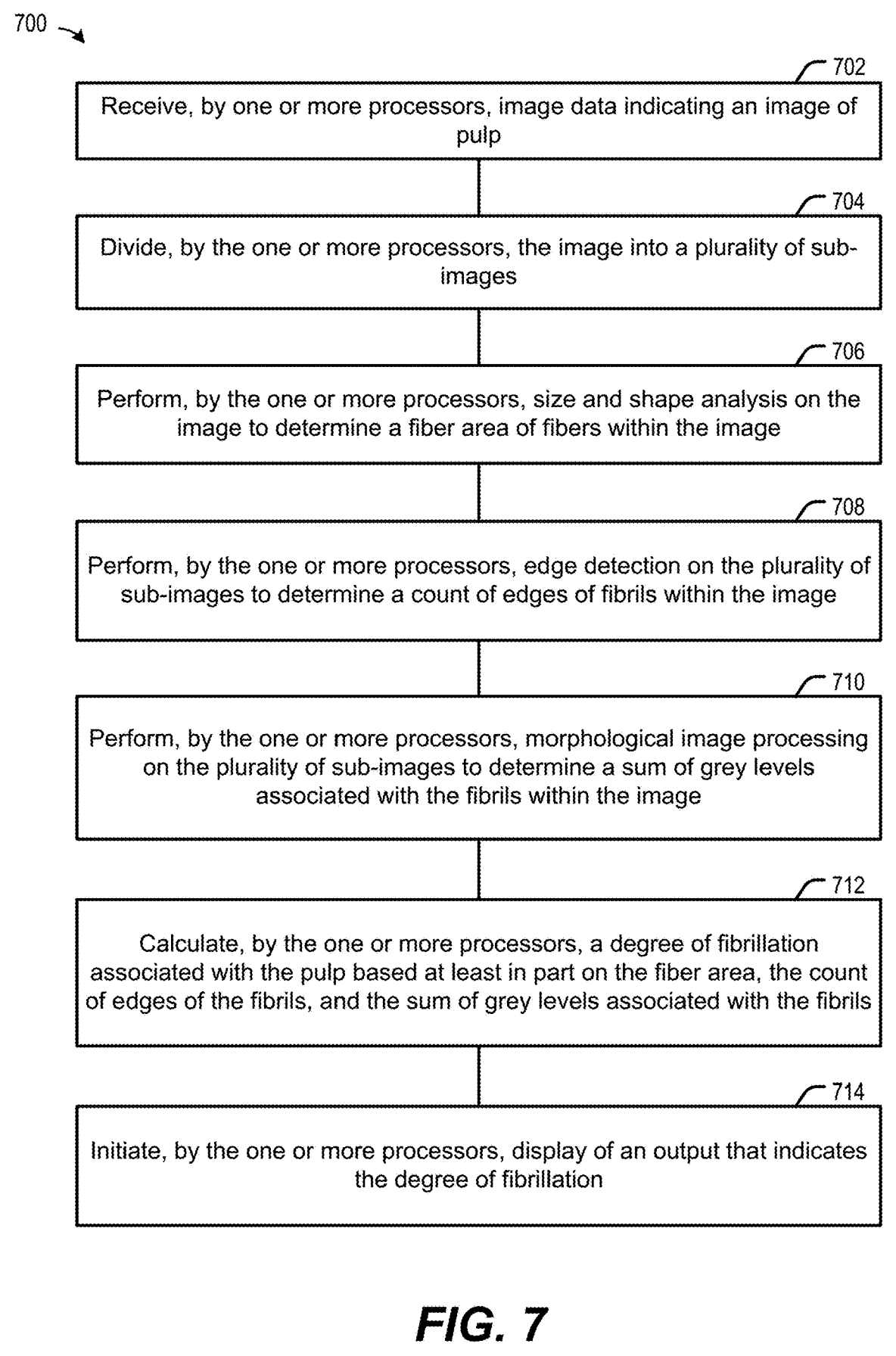

700

702
Receive, by one or more processors, image data indicating an image of pulp

704
Divide, by the one or more processors, the image into a plurality of sub-images 706
Perform, by the one or more processors, size and shape analysis on the image to determine a fiber area of fibers within the image 708
Perform, by the one or more processors, edge detection on the plurality of sub-images to determine a count of edges of fibrils within the image 710
Perform, by the one or more processors, morphological image processing on the plurality of sub-images to determine a sum of grey levels associated with the fibrils within the image 712
Calculate, by the one or more processors, a degree of fibrillation associated with the pulp based at least in part on the fiber area, the count of edges of the fibrils, and the sum of grey levels associated with the fibrils 714
Initiate, by the one or more processors, display of an output that indicates the degree of fibrillation

*FIG. 7*

SYSTEM AND METHOD FOR QUANTIFYING A DEGREE OF FIBRILLATION OF FIBERS WITHIN PULP USING IMAGE PROCESSING

CROSS-REFERENCE TO RELATED APPLICATIONS

This is a U.S. National Phase Application Under U.S.C. § 371 of International Patent Application No. PCT/US2022/040052, filed Aug. 11, 2022, which claims priority, to and the benefit under 35 U.S.C. § 119(e), to U.S. Provisional Application No. 63/237,840, filed Aug. 27, 2021, the contents of each of which are fully incorporated herein by reference.

FIELD OF DISCLOSURE

The present disclosure is generally related to quantifying the degree of fibrillation of fibrillated fibers, and more particularly to systems and methods for determining the degree of fibrillation based on image processing.

BACKGROUND

Pulp that contains wood fibers or non-wood fibers may be used in a variety of products, such as fiber-reinforced materials, building materials, electrical insulating paper, food packaging and other product packaging, decorative materials, and the like. One area of research for pulp product manufacturing is highly fibrillated fibers. For example, highly fibrillated fibers, for example fibers having been subjected to a physical or chemical treatment that caused tearing of part of their material as thin, hairy structures referred to as fibrils, may provide enhanced structural and barrier properties to pulp products that include such highly fibrillated fibers. Fibrillation of the fibers affects the physical properties of the pulp, and thus one measure of quality of such pulp is the degree of fibrillation within the pulp. Due to the very small sizes of the fibrils, determining the degree of fibrillation within the pulp is difficult. A drainage process may provide an estimate of the degree of fibrillation, but the estimate may not be sufficiently accurate for indicating the quality of the pulp or determining other physical properties. Additionally, the drainage process may only be useful for a limited range of widths of fibrillated fibers. As pulp processing technology improves and the widths of fibrillated fibers and fibrils decrease, it becomes increasingly difficult or impossible to accurately determine the degree of fibrillation and other characteristics of fibers within pulp.

SUMMARY

The present disclosure is related to systems, methods, and computer-readable storage media that leverage image processing to determine fibrillation within pulp. One characteristic of pulp is fibrillation, which refers to the quantity of "fibrils" within the pulp. Fibrils may be formed by opening fibers within the pulp to free the fibrils. The fibrils may form clusters of various density that are attached to the fibers or detached from the fibers. The fibrils may also be separate from the clusters and may remain attached to a fiber, or may be detached from the fibers and floating within the pulp, which may be referred to as "free fibrils." The systems and methods disclosed herein provide for automatic determination of a degree of fibrillation of pulp based on one or more images of the pulp from a microscope, a camera, or another type of image capture device. The degree of fibrillation is a ratio of the area of all fibrils within the image compared to the area of all fibers, not including fibrils, in the image. For example, the systems and methods of the present disclosure may perform two or more of the following image processing techniques: adaptive thresholding and binarization, edge detection, morphological image processing, local statistical analysis, and Hough transform, on an image or multiple sub-images of the image to determine the degree of fibrillation. By using multiple types of image processing, the systems and methods of the present disclosure may compensate for weaknesses of one type of image processing in distinguishing fibers from fibrils within the pulp, which may improve the accuracy of the determined degree of fibrillation. The degree of fibrillation may indicate a quality of the pulp or a suitability of the pulp for use in particular products.

To illustrate, an electronic device may receive image data indicating an image of pulp, such as from an image capture device. The electronic device may divide the image into multiple sub-images and may perform various image processing on the image, or the sub-images. For example, the electronic device may perform size and shape analysis, such as adaptive thresholding and binarization, on the image to identify fibers within the image and to determine a fiber area associated with the fibers. As another example, the electronic device may perform edge detection on the sub-images to identify edges of fibers and fibrils within the image, and to determine a count of edges of the fibrils. As another example, the electronic device may perform morphological image processing on the sub-images to determine a sum of grey levels associated with fibrils in the image, which may indicate edges of the fibrils. As yet another example, the electronic device may perform local statistical analysis on the sub-images to identify fibers and fibrils within the image, which may be used to refine the outputs of the size and shape analysis, the edge detection, the morphological image processing, or a combination thereof. As another example, the electronic device may perform Hough transforms on the sub-images to distinguish fibers from other elements of the image, which may be used to refine the fiber area determined by the size and shape analysis. In some implementations, the electronic device may be configured to adjust one or more image processing parameters during operation, such as based on light levels within the image, resolution within the image, or other characteristics of the image, to tune the image processing to the particular image.

The electronic device may also determine a degree of fibrillation within the pulp based on the outputs of the various image processing. For example, the electronic device may determine multiple values of the degree of fibrillation, such as based on the fiber area and the count of edges or based on the fiber area and the sum of grey levels, and the electronic device may determine a final output value of the degree of fibrillation based on a weighted average of the multiple values of the degree of fibrillation. The electronic device may initiate display of the degree of fibrillation, such as via a graphical user interface (GUI) that displays the degree of fibrillation and, optionally, other information such as identification of fibers, clusters of fibrils attached to fibers, loose or free clusters of fibrils, fibrils attached to fibers, and free fibrils within the image.

The present disclosure describes techniques that support automatic determination of a degree of fibrillation, also referred to as a fibrillation ratio, of pulp based on an image using image processing techniques. For example, the degree of fibrillation may be determined based on performance of size and shape analysis that may include adaptive thresholding and binarization, edge detection, morphological image processing, local statistical analysis, Hough transforms, or a combination thereof. The degree of fibrillation determined according to the present disclosure may be more accurate than a degree of fibrillation determined based on a single type of image processing, as each of the different types of image processing may compensate for weaknesses associated with one or more other types of image processing. As an example, the size and shape analysis may be used to identify the darkest parts of the image, which may correspond to fibers and strong clustered fibrils, and the Hough transformations may be used to distinguish the fibers from the fibrils based on length and shape. Thus, the systems and methods of the present disclosure may determine a more accurate degree of fibrillation, as well as distinguishing fibers from clusters of fibrils attached to fibers, free clusters of fibrils, fibrils attached to fibers, and free fibrils, as compared to other techniques. Additionally, the systems and methods of the present disclosure may automatically determine the degree of fibrillation based on one or more images from a microscope or other image capture device, which may reduce or eliminate human input in the determination process. The degree of fibrillation, and other information, may be used as an indicator of quality of highly fibrillated pulp.

In a particular aspect, a method for determining a degree of fibrillation within pulp using image processing includes receiving, by one or more processors, image data indicating an image of pulp. The method also includes dividing, by the one or more processors, the image into a plurality of sub-images. The method includes performing, by the one or more processors, size and shape analysis on the image to determine a fiber area of fibers within the image. The method also includes performing, by the one or more processors, edge detection on the plurality of sub-images to determine a count of edges of fibrils within the image. The method includes performing, by the one or more processors, morphological image processing on the plurality of sub-images to determine a sum of grey levels associated with the fibrils within the image. The method also includes calculating, by the one or more processors, a degree of fibrillation associated with the pulp based at least in part on the fiber area, the count of edges of the fibrils, and the sum of grey levels associated with the fibrils. The method further includes initiating, by the one or more processors, display of an output that indicates the degree of fibrillation.

In a particular aspect, a system for determining a degree of fibrillation within pulp using image processing includes a memory and one or more processors communicatively coupled to the memory. The one or more processors are configured to receive image data indicating an image of pulp. The one or more processors are also configured to divide the image into a plurality of sub-images. The one or more processors are configured to perform size and shape analysis on the image to determine a fiber area of fibers within the image. The one or more processors are also configured to perform edge detection on the plurality of sub-images to determine a count of edges of fibrils within the image. The one or more processors are configured to perform morphological image processing on the plurality of sub-images to determine a sum of grey levels associated with the fibrils within the image. The one or more processors are also configured to calculate a degree of fibrillation associated with the pulp based at least in part on the fiber area, the count of edges of the fibrils, and the sum of grey levels associated with the fibrils. The one or more processors are further configured to initiate display of an output that indicates the degree of fibrillation.

In a particular aspect, a non-transitory computer-readable storage medium stores instructions that, when executed by one or more processors, cause the one or more processors to perform operations for determining a degree of fibrillation within pulp using image processing. The operations include receiving image data indicating an image of pulp. The operations also include dividing the image into a plurality of sub-images. The operations include performing size and shape analysis on the image to determine a fiber area of fibers within the image. The operations also include performing edge detection on the plurality of sub-images to determine a count of edges of fibrils within the image. The operations include performing morphological image processing on the plurality of sub-images to determine a sum of grey levels associated with the fibrils within the image. The operations also include calculating a degree of fibrillation associated with the pulp based at least in part on the fiber area, the count of edges of the fibrils, and the sum of grey levels associated with the fibrils. The operations further include initiating display of an output that indicates the degree of fibrillation.

Some details associated with the aspects of the present disclosure are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 7 is a flow diagram illustrating an example of a method for determining a degree of fibrillation within pulp using image processing according to aspects of the present disclosure.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Figure 1:
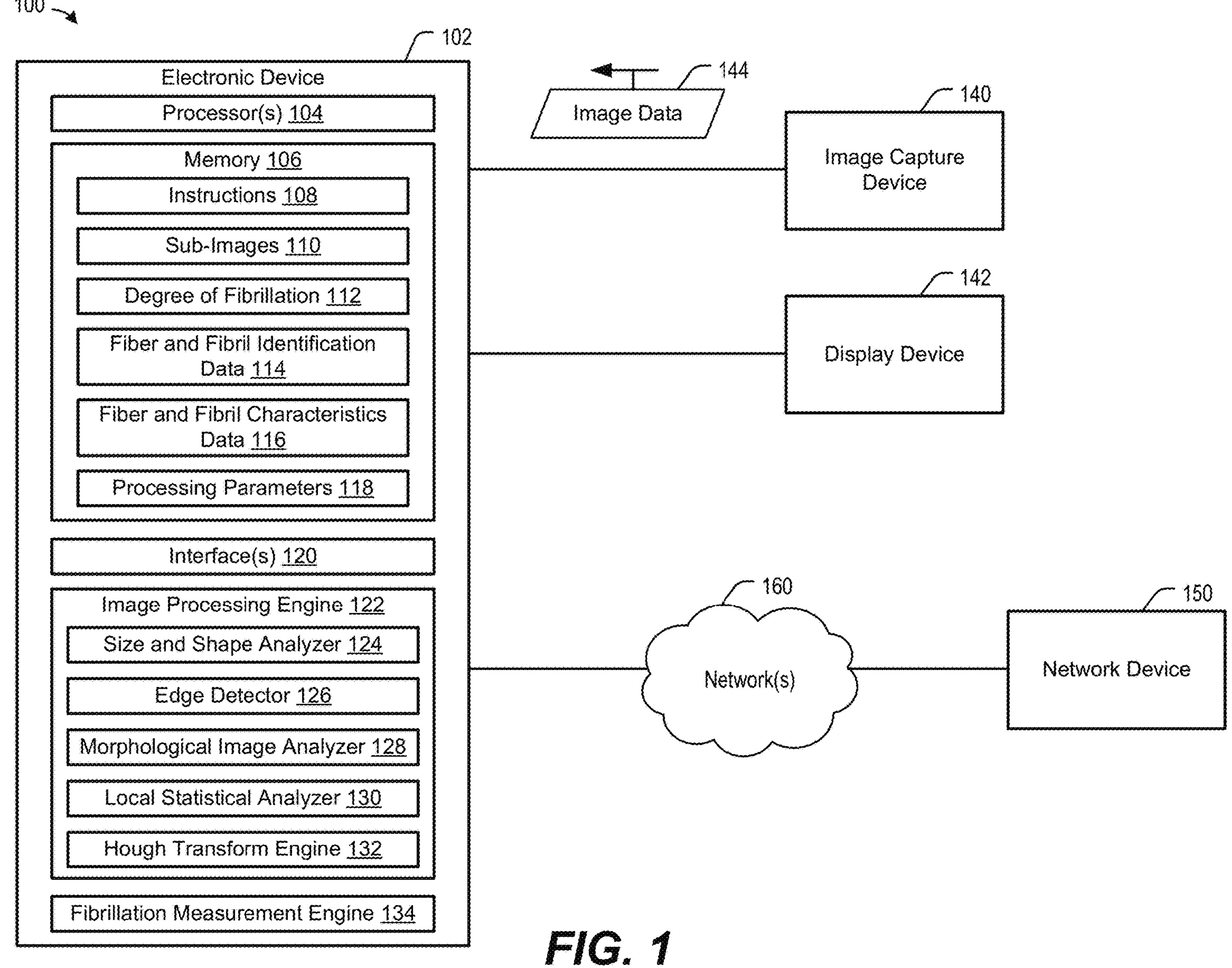
FIG. 1 is a block diagram of an example of a system for determining fibrillation within pulp using image processing according to aspects of the present disclosure.

Referring to FIG. 1, an example of a system for determining fibrillation within pulp using image processing according to aspects of the present disclosure is shown as a system 100. The system 100 may be configured to determine a degree of fibrillation within one or more images of pulp. Fibrillation refers to the quantity of "fibrils" within the pulp. Fibrils may be formed by opening fibers within the pulp to free the fibrils. The fibrils may form clusters of various density that are attached to the fibers or that are detached from the fibers. The fibrils may also be separate from the clusters and may be attached to the fibers or float within the pulp, such as by being detached from the fibers, which may be referred to as "free fibrils." The system 100 may be configured to analyze the fibrillation of highly fibrillated pulps, such as those including surface enhanced pulp fibers (SEPF) or other highly fibrillated fibers. SEPF may be highly fibrillated fibers, that can be hardwood fibers, softwood fibers, or non-wood fibers. In some implementations, the SEPF are hardwood fibers. SEPF can have higher surface areas compared to conventionally-refined fibers, and can be made in a manner that mitigates reductions in fiber length that occur in conventional refining processes. For example, SEPF can have a length weighted average fiber length that is greater than or equal to any one of, or between any two of, 0.20 millimeters (mm), 0.30 mm, 0.40 mm, 0.50 mm, 0.60 mm, 0.70 mm, 0.80 mm, 0.90 mm, 1.0 mm, 1.5 mm, or 2.0 mm, and an average hydrodynamic specific surface area that is greater than or equal to any one of, or between any two of, 10 $m^2/g$, 12 $m^2/g$, 14 $m^2/g$, 16 $m^2/g$, 18 $m^2/g$, or 20 $m^2/g$. As particular examples, the SEPF can have a length weighted average fiber length that is greater than or equal to 0.20 mm, 0.30 mm, or 0.40 mm or between 1.0 mm and 2.0 mm and an average hydrodynamic specific surface area that is greater than or equal to 10 $m^2/g$ or 12 $m^2/g$. Optionally, the number of SEPF can be at least 12,000 per milligram on an oven-dry basis, for example based on a sample of the SEPF that is dried in an oven set at 105° C. for 24 hours. A description of SEPF and processes by which SEPF can be made are set forth in further detail in U.S. patent application Ser. No. 13/836,760, filed Mar. 15, 2013, and published as Pub. No. US 2014/0057105 on Feb. 27, 2014, which is incorporated herein by reference.

As shown in FIG. 1, the system 100 includes an electronic device 102, an image capture device 140, a display device 142, a network entity 150, and one or more networks 160. Although one network entity 150 is illustrated in FIG. 1, in other implementations, the system 100 may include multiple network entities 150. Additionally or alternatively, although the image capture device 140 and the display device 142 are illustrated in FIG. 1 as being external to the electronic device 102, in other implementations the image capture device 140, the display device 142, or both, may be included in or integrated within the electronic device 102.

The electronic device 102 includes one or more processors 104, a memory 106, one or more communication interfaces 120, an image processing engine 122, and a fibrillation measurement engine 134. The electronic device 102 may include or correspond to a computing device, a server, a mobile device, a smart image capture device, another electronic device, or a combination thereof. As used herein, a computing device may include a laptop computing device, a desktop computing device, a tablet computing device, or the like, a mobile device may include a mobile phone or smartphone, a tablet device, a wearable device, or the like, and a smart image capture device may include a microscope or camera with display capabilities. It is noted that functionalities described with reference to the electronic device 102 are provided for purposes of illustration, rather than by way of limitation and that the exemplary functionalities described herein may be provided via other types of computing resource deployments. For example, in some implementations, computing resources and functionality described in connection with the electronic device 102 may be provided in a distributed system using multiple servers or other computing devices, or in a cloud-based system using computing resources and functionality provided by a cloud-based system using computing resources and functionality provided by a cloud-based environment that is accessible over a network, such as the one of the one or more networks 160.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the electronic device 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the electronic device 102 may be stored in the memory 106 as instructions 108 that, when executed by the one or more processors 104, cause the one or more processors 104 to perform the operations described herein with respect to the electronic device 102, as described in more detail below. Additionally, the memory 106 may be configured to store data, such as sub-images 110, a degree of fibrillation 112, fiber and fibril identification data 114, fiber and fibril characteristics data 116, and processing parameters 118. Exemplary aspects of the sub-images 110, the degree of fibrillation 112, the fiber and fibril identification data 114, the fiber and fibril characteristics data 116, and the processing parameters 118 are described in more detail below.

The one or more communication interfaces 120 may be configured to communicatively couple the electronic device 102 to the one or more networks 160 via wired or wireless communication links established according to one or more communication protocols or standards, such as an Ethernet protocol, a transmission control protocol/internet protocol (TCP/IP), an Institute of Electrical and Electronics Engineers (IEEE) 802.11 protocol, an IEEE 802.16 protocol, a $3^{rd}$ Generation (3G) communication standard, a 4th Generation (4G)/long term evolution (LTE) communication standard, a 5th Generation (5G) communication standard, and the like. In some implementations, the electronic device 102 includes one or more input/output (I/O) devices that include one or more display devices, which may include the display device 142, a keyboard, a stylus, one or more touchscreens, a mouse, a trackpad, a microphone, a camera, one or more speakers, haptic feedback devices, one or more image capture devices, which may include the image capture device 140, or other types of devices that enable a user to receive information from or provide information to the electronic device 102.

The image processing engine 122 may be configured to perform image processing on image data 144 received from the image capture device 140 to identify fibers and fibrils within an image of pulp represented by the image data 144. For example, the image processing engine 122 may be configured to convert the image to one or more other formats, to divide the image into sub-images, and to perform size and shape analysis, edge detection, morphological image processing, local statistical analysis, Hough transforms, or a combination thereof, based on the image or the sub-images. Although described herein with respect to a single image, in other implementations, the image processing engine 122 may be configured to perform image processing on multiple images, and to aggregate the results for the multiple images, such as by determining an average or a weighted average.

To illustrate, the image processing engine 122 may be configured to convert the image represented by the image data 144 to a particular format for further processing. In some implementations, the format is an 8-bit grey level format. For example, the image may be an RGB image having a particular size, such as 5000×7000 pixels, and the image processing engine 122 may be configured to convert the image to an 8-bit format having 256 grey levels. In other implementations, the image may be converted to a different format. After formatting the image, the image processing engine 122 may be configured to divide the image into multiple sub-images 110. As a particular example in which the image has a size of 5000×7000 pixels, the image processing engine 122 may be configured to divide the image into 35 sub-images each having a size of 1000×1000 pixels. In other implementations, the sub-images 110 may have a different size.

To perform the various types of image processing, the image processing engine 122 may include a size and shape analyzer 124, an edge detector 126, a morphological image analyzer 128, a local statistical analyzer 130, and a Hough transform engine 132. Although FIG. 1 shows the image processing engine 122 including each of the size and shape analyzer 124, the edge detector 126, the morphological image analyzer 128, the local statistical analyzer 130, and the Hough transform engine 132, in some other implementations, one or more of the size and shape analyzer 124, the edge detector 126, the morphological image analyzer 128, the local statistical analyzer 130, and the Hough transform engine 132 may be optional.

The size and shape analyzer 124 may be configured to perform size and shape analysis on elements of the image represented by the image data 144 to identify fibers in the image and to determine a fiber area associated with the fibers in the image. The fiber area may be determined as a sum of the areas of each fiber in the image. In some implementations, the size and shape analysis may include adaptive thresholding and binarization operations. To illustrate, the size and shape analyzer 124 may be configured to generate an image histogram of grey levels based on the image. In some implementations, the image histogram is generated, after conversion of the image to the particular format. The size and shape analyzer 124 may also be configured to perform adaptive thresholding based on the image histogram, and to perform binarization on the image after the adaptive thresholding to generate a binary image. The size and shape analyzer 124 may be configured to identify fibers, which may include some opaque clusters of fibrils, based on the binary image. The size and shape analyzer 124 may also be configured to determine the fiber area based on the identified fibers. Additional details of the operations of the size and shape analyzer 124 are described further herein, with reference to FIG. 3. Although described as being performed on the image, in some other implementations, the size and shape analysis may be performed on the sub-images 110, and the results may be aggregated to determine the fiber area.

In some implementations, the size and shape analysis, such as the adaptive thresholding and binary processing, may identify the darkest parts of the image, which correspond to fibers, clusters of fibrils, and the strongest fibrils. For example, the adaptive thresholding and binary processing may distinguish fibers, clusters of fibrils, and strong fibrils, which appear dark, from the background of the image, which typically appears white or is the lightest part of the image. Because the fibers are typically larger than the fibrils, even the strong fibrils or clusters of fibrils, the fiber area determined based on the identified fibers, clusters of fibrils, and strong fibrils may be dominated by the fibers, thus the fiber area determined by the size and shape analyzer 124 may approximate the fiber area of fibers in the image. In some implementations, the fiber area may be refined or adjusted based on results of other image processing that is more likely to distinguish between fibers, clusters of fibrils, and fibrils, such as a Hough transform, thereby improving the accuracy and/or precision of the fiber area.

The edge detector 126 may be configured to perform edge detection on the sub-images 110 to identify edges of fibrils within the sub-images 110 and to determine a count of edges of fibrils within the image. In some implementations, the count of edges may include or correspond to a sum of the lengths of the identified edges of fibrils within each of the sub-images 110. To illustrate, the edge detector 126 may generate a sub-image histogram of grey levels for each of the sub-images 110, and the edge detector 126 may use the respective sub-image histogram to determine a minimum grey level associated with each of the sub-images 110. The edge detector 126 may also be configured to perform adaptive thresholding and binarization for each of the sub-images 110 based on the respective minimum grey level, to filter and dilate the binary sub-images, and to detect edges of fibrils within the binary sub-images using one or more edge detection operations. The detected fibril edges may be used to determine the count of edges of fibrils within the image. Operations of the edge detector 126 are further described herein with reference to FIGS. 4A-B.

In some implementations, the edge detection may identify edges of fibrils and some fibers. To illustrate, the edge detector 126 may be configured to apply a local adaptive threshold to the sub-images 110 to isolate features including fibers, fibrils, chunks of fibrils, debris, etc., from the background of the sub-images 110. Applying the local adaptive threshold on the sub-image level, as compared to the entire image, may accommodate for large scale grey level variability in the background of the image due to non-uniformity of lighting. To accommodate for small scale fluctuations in grey levels due to the particulars of the pulp sample, for each sub-image, the mode of the peak of the sub-image histogram is determined. The mode of the peak of the sub-image histogram may include or correspond to the background grey levels. In some such implementations, a first part, such as a portion to the right, of the peak is counted to determine the number of pixels that are whiter than the mode, and a proportionate threshold is applied to a second part, such as a portion to the left, of the peak to separate the background from the features. After distinguishing the backgrounds of the sub-images 110, the sub-images 110 may be binarized, and edges of the features may be detected in the binary sub-images. For example, the binary sub-images may be dilated, such as using a 3×3 kernel, as a non-limiting example, the features may be subtracted from the dilated sub-images, and subsequently edges of the features may be determined. The edges of the fibrils and fibers detected in each sub-image may be summed, and the total edges, also referred to or including a total perimeter of all fibers, for each of the sub-images 110 may be summed to determine the count of edges for fibrils and fibers within the image. In highly fibrillated pulp, the number of fibrils may be significantly greater than the number of fibers, thus, the edges determined for the identified fibers and fibrils may be dominated by the edges of fibrils, and this count of edges may approximate the perimeter of the fibrils within the image. The edge detection may not be able to identify edges of fibrils within opaque clusters or weak fibrils, thus, in some implementations, the count of edges may be refined or adjusted based on results of other image processing that is more likely to distinguish between types of fibrils, such as local statistical analysis, thereby improving the accuracy and/or precision of the count of edges.

The morphological image analyzer 128 may be configured to perform morphological image processing on the sub-images 110 to determine a sum of grey levels associated with the fibrils within the image. Morphological image processing operations may include one or more non-linear operations that are related to feature shape or morphology and are particularly suited for removing "imperfections," such as distortions by noise or texture, that may be caused by thresholding and binarization. In some implementations, the morphological image processing operations performed by the morphological image analyzer 128 may include convolution operations. To illustrate, the morphological image analyzer 128 may be configured to convolve each of the sub-images 110 based on an expected fibril width, in some implementations, in both the horizontal and vertical directions, to reconstruct a full convolution image based on absolute values of the convolution sub-images, and to determine the sum of grey levels associated with the fibrils within the image based on the full convolution image. The sum of grey levels may indicate, and may be converted to, areas of fibrils within the image, and the areas may be used to determine a total fibril area. Operations of the morphological image analyzer 128 are described further herein, with reference to FIG. 5.

In some implementations, the morphological image processing provides a stronger response the closer a feature in a sub-image is to a particular criterion. The criterion used by the morphological image analyzer 128 may include a full-hat filter, a half-hat filter, or another type of filter. In some implementations, the morphological image analyzer 128 may be configured to perform the morphological image processing, such as the convolution operations, using a half-hat filter based on an expected width of a fibril. Such operations may detect changes in grey levels within the sub-images 110 that are associated with the presence of fibrils and other similarly sized features. Performing the morphological image processing, such as the convolution operations, using both a vertical half-hat filter and a horizontal half-hat filter may identify features having the desired size and shape, regardless of their direction within the sub-images 110. Similar to the edge detection, the morphological image processing may identify fibers as well as fibrils, but as described above, because the number of fibrils may substantially outnumber the number of fibers, an area determined based on the combination of fibers and fibrils may approximate the area of fibrils without fibers. Additionally, although the morphological image processing may identify more weak fibrils than the edge detection, some weak fibrils may be too small or weak to be identified by the morphological image processing, and the morphological image processing may be more likely to incorrectly identify debris than the edge detection. Thus, in some implementations, an area determined based on the sum of grey levels may be refined or adjusted based on results of other image processing that is more likely to distinguish between types of fibrils and debris, such as local statistical analysis, thereby improving the accuracy and/or precision of the sum of grey levels and/or the area based on the sum of grey levels.

The local statistical analyzer 130 may be configured to perform local statistical analysis on regions of the image, or on the sub-images 110, to identify fibers or fibrils within the image. To illustrate, the local statistical analyzer 130 may be configured to determine local standard deviations of grey levels for multiple regions within the image, to compare a respective local standard deviation of grey levels for each region to an average deviation of grey levels associated with the image, and to identify the fibers or the fibrils based on the comparison. The identified fibers or fibrils may be used to refine the output of one or more of the size and shape analyzer 124, the edge detector 126, and the morphological image analyzer 128. As one example, if fibers are identified by the local statistical analyzer 130, the identified fibers may be used to refine the fiber area determined by the size and shape analyzer 124, such as by determining a weighted average of the fiber area determined by the size and shape analyzer 124 and a fiber area associated with the identified fibers by the local statistical analyzer 130. As another example, if fibrils are identified by the local statistical analyzer 130, the identified fibrils may be used to refine the count of edges determined by the edge detector 126 or the sum of grey levels determined by the morphological image analyzer 128, or values determined based on these outputs. Alternatively, the local statistical analyzer 130 may be configured to identify fibers or fibrils within the image, and the identified fibers or fibrils may be provided as input to the size and shape analyzer 124, the edge detector 126, or the morphological image analyzer 128, for further distinguishing of the identified fibers by the size and shape analyzer 124 or for further distinguishing of the identified fibrils by the edge detector 126, the morphological image analyzer 128, or a combination thereof.

In some implementations, the local statistical analysis may identify features or fibrils in the sub-images 110 based on their respective local statistical signatures. For example, comparing mean grey levels and/or standard deviations of grey levels to average grey levels or average standard deviations of grey levels may identify void areas and parts of fibers. As another example, identifying areas of high grey level average and/or relatively high grey level standard deviation may identify fibrils, or distinguish fibrils from other features or other types of fibrils. The fibers and/or fibrils identified using the local statistical analysis may be used to refine the fiber area determined by the size and shape analyzer 124, the count of edges determined by the edge detector 126, and/or the sum of grey levels or a fibril area determined based on the sum of grey level determined by the morphological image analyzer 128. Alternatively, the fibers and/or fibrils determined by the local statistical analysis may be used to determine an additional fiber area and an additional count of edges of fibrils, which may include or correspond to an additional perimeter of fibrils and may be used to determine the degree of fibrillation 112, as further described herein.

The Hough transform engine 132 may be configured to perform one or more Hough transforms on the image, or on the sub-images 110, to distinguish fibers from other elements within the image. A Hough transform may be useful for distinguishing elements having a particular shape or length. To illustrate, because fibers are typically longer and straight, and fibrils are typically shorter and curved, the Hough transform engine 132 may be configured to perform one or more Hough transforms based on an expected length or straightness to identify fibers within the image. The identified fibers may be used to refine the output of the size and shape analyzer 124. For example, the identified fibers may be used to refine the fiber area determined by the size and shape analyzer 124, such as by determining a weighted average of the fiber area determined by the size and shape analyzer 124 and a fiber area associated with the identified fibers by the Hough transform engine 132. Alternatively, the Hough transform engine 132 may be configured to identify fibers within the image, and the identified fibers may be provided as input to the size and shape analyzer 124, for further distinguishing of the identified fibers by the size and shape analyzer 124.

In some implementations, the Hough transforms may distinguish fibers based on the fibers typically being long and relatively straight, as compared to fibrils, which are typically shorter and curved. In general, the Hough transform is a feature extraction technique that identifies predefined instances of objects, such as lines, circles, or ellipses, using a voting procedure carried out in a parameter space. A typical Hough transform detects perfectly straight lines. Thus, the Hough transform engine 132 may be configured to perform modified Hough transforms that detect substantially straight lines that correspond to the expected straightness of fibers. The fibers identified using the Hough transforms may be used to refine the fiber area determined by the size and shape analyzer 124. Alternatively, the fibers determined by the Hough transforms may be used to determine an additional fiber area, which may be used to determine the degree of fibrillation 112, as further described herein.

The fibrillation measurement engine 134 may be configured to determine a degree of fibrillation associated with the pulp in the image, and optionally additional fibrillation-related information, based on data from the image processing engine 122. To illustrate, the fibrillation measurement engine 134 may be configured to receive outputs of the size and shape analyzer 124, the edge detector 126, the morphological image analyzer 128, the local statistical analyzer 130, the Hough transform engine 132, or a combination thereof, and to determine the degree of fibrillation 112 based on the outputs. In some implementations, the fibrillation measurement engine 134 may be configured to determine multiple shape factors that are each indicative of the degree of fibrillation based on some of the outputs of the image processing engine 122, and the fibrillation measurement engine 134 may be configured to calculate the degree of fibrillation 112 based on the shape factors, such as based on a weighted average of the shape factors. As one example, the fibrillation measurement engine 134 may be configured to determine a first degree of fibrillation based on the fiber area from the size and shape analyzer 124 and the count of edges from the edge detector 126, to determine a second degree of fibrillation based on the fiber area and the sum of grey levels or areas of fibrils identified based on the sum of grey levels from the morphological image analyzer 128, and to calculate the degree of fibrillation 112 based on a weighted average of the first degree of fibrillation and the second degree of fibrillation. In some implementations, the first degree of fibrillation may be determined based on a ratio of the perimeter of fibrils and the square root of the fiber area, as further described herein. The second degree of fibrillation may be determined based on a ratio of the fibril area and the fiber area. The weights may be based on the priority of the respective image processing techniques used to determine the degrees of fibrillation, characteristics associated with the image or sub-images used to determine the degrees of fibrillation, estimated accuracies associated with the degrees of fibrillation, other information, or a combination thereof. In some implementations, the fibrillation measurement engine 134 may also be configured to determine degrees of fibrillation based on outputs of the local statistical analyzer 130 and/or the Hough transform engine 132, and these degrees of fibrillation may also be averaged to determine the degree of fibrillation 112. Alternatively, the outputs of the local statistical analyzer 130 and/or the Hough transform engine 132 may be used to refine the fiber area, the count of edges, the sum of grey areas, or a combination thereof, prior to receipt by the fibrillation measurement engine 134. Operations of the fibrillation measurement engine 134 are further described herein with reference to FIG. 6.

The fibrillation measurement engine 134 may also be configured to determine other information associated with the fibers and fibrils within the image. For example, the fibrillation measurement engine 134 may be configured to generate the fiber and fibril identification data 114 based on the outputs of the size and shape analyzer 124, the edge detector 126, the morphological image analyzer 128, the local statistical analyzer 130, and/or the Hough transform engine 132. The fiber and fibril identification data 114 may identify one or more fibers within the image, one or more fibril clusters attached to fibers within the image, one or more free fibril clusters within the image, one or more fibrils attached to fibers within the image, one or more free floating fibrils within the image, or a combination thereof. As another example, the fibrillation measurement engine 134 may be configured to generate the fiber and fibril characteristics data 116 based on the outputs of the size and shape analyzer 124, the edge detector 126, the morphological image analyzer 128, the local statistical analyzer 130, and/or the Hough transform engine 132. The fiber and fibril characteristics data 116 may indicate lengths, widths, distributions of sizes, other characteristics, or a combination thereof, associated with the fibers, clusters of fibrils attached to fibers, free clusters of fibrils, fibrils attached to fibers, and free fibrils, or a combination thereof.

The image capture device 140 may be configured to capture one or more images of the pulp that are represented by the image data 144. For example, the image capture device 140 may include a microscope, a camera, a video camera, or another image capture device capable of capturing images of pulp at microscopic resolutions. The display device 142 may be configured to display an output based on the degree of fibrillation 112, the fiber and fibril identification data 114, the fiber and fibril characteristic data 116, or a combination thereof. For example, the display device 142 may be configured to display a graphical user interface (GUI) that displays the image of the pulp, optionally with identification of fibers and fibrils, such as identification of clusters of fibrils attached to fibers, free clusters of fibrils, fibrils attached to fibers, and free fibrils, and the degree of fibrillation 112. In some implementations, the display device 142 may include a monitor, a liquid crystal display (LCD) screen, a touchscreen, a virtual reality (VR) or augmented reality (AR) display, or another type of display device.

The network entity 150 may include or correspond to a computing device, a server, a mobile device, a user device, a network storage device, or a combination thereof. The network entity 150 may be configured to receive an output from the electronic device 102 and to display the output, store the output, control a pulp or product manufacturing process based on the output, or a combination thereof. The network entity 150 may include one or more processors, a memory, and one or more communication interfaces. The one or more processors may include one or more microcontrollers, ASICs, FPGAs, CPUs having one or more processing cores, or other circuitry and logic configured to facilitate the operations of the network entity 150 in accordance with aspects of the present disclosure. The memory may include RAM devices, ROM devices, EPROM, EEPROM, one or more HDDs, one or more SSDs, flash memory devices, NAS devices, or other memory devices configured to store data in a persistent or non-persistent state. Software configured to facilitate operations and functionality of the network entity 150 may be stored in the memory as instructions that, when executed by the one or more processors, cause the one or more processors to perform the operations described herein with respect to the network entity 150, as described in more detail below. The one or more communication interfaces may be configured to communicatively couple the network entity 150 to the one or more networks 160 via wired or wireless communication links established according to one or more communication protocols or standards, such as an Ethernet protocol, a TCP/IP, an IEEE 802.11 protocol, an IEEE 802.16 protocol, a 3G communication standard, a 4G/LTE communication standard, a 5G communication standard, and the like.

During operation of the system 100, the image capture device 140 may capture an image, or multiple images, of pulp, such as at a microscopic resolution. The pulp may be highly fibrillated, such that the number of fibrils in the pulp is much greater than the number of fibers in the pulp. The electronic device 102 may receive the image data 144 that represents the image or the images from the image capture device 140. In some implementations, the image processing engine 122 may convert the image data 144 to a particular format, such as an 8-bit grey level format having a 5000×7000 pixel size, as a non-limiting example. The image processing engine 122 may divide the image represented by the image data 144 into the sub-images 110, such as sub-images having a 1000×1000 pixel size, as a non-limiting example.

After dividing the image into the sub-images 110, the image processing engine 122, or components thereof, may perform particular types of image processing on the image, or the sub-images 110, to identify fibers and fibrils within the image. For example, the size and shape analyzer 124 may perform size and shape analysis on the image to determine a fiber area associated with fibers within the image. In some implementations, the size and shape analysis may include generating an image histogram based on the image or the converted image, performing adaptive thresholding on the image based on the image histogram, performing binarization on the image to generate a binary image, identifying fibers within the binary image, and determining the fiber area associated with the fibers, as further described with reference to FIG. 3.

The edge detector 126 may perform edge detection on the sub-images 110 to determine a count of edges of fibrils within the image. The count of edges may correspond to a total perimeter of all identified fibrils within the image. In some implementations, the count of edges may include edges of fibrils and edges of fibers, however, for highly fibrillated pulps, fibrils may significantly outnumber fibers, and thus the count of edges of fibrils and fibers may approximate the count of edges of fibrils. To illustrate, the edge detector 126 may generate sub-image histograms of grey levels for the sub-images 110, determine minimum grey levels associated with the sub-images 110 based on the sub-image histograms, perform adaptive thresholding on the sub-images 110 based on the minimum grey levels, binarize the sub-images 110 after thresholding, filter and dilate the binary sub-images, perform edge detection on the binary sub-images, and aggregate the edges of the binary sub-images to determine the count of edges for fibrils within the image, as further described with reference to FIGS. 4A-B.

The morphological image analyzer 128 may perform morphological image processing on the sub-images 110 to determine a sum of grey levels associated with the fibrils within the image. The morphological image processing may include convolution operations. To illustrate, the morphological image analyzer 128 may convolve the sub-images 110 based on an expected fibril width in a vertical direction to generate vertical convolution sub-images, convolve the sub-images 110 based on the expected fibril width in a horizontal direction to generate horizontal convolution sub-images, and determine average convolution sub-images based on absolute values of the vertical convolution sub-images and the horizontal convolution sub-images. The morphological image analyzer 128 may also reconstruct a full convolution image based on the average convolutional sub-images, and the morphological image analyzer 128 may determine the sum of grey levels associated with the fibrils based on the full convolutional image, as further described herein with reference to FIG. 5.

The local statistical analyzer 130 may perform local statistical analysis on regions of the image, or the sub-images 110, to identify the fibers or the fibrils within the image. The regions may be local pixel neighborhoods within the sub-images 110, or another size region. To illustrate, the local statistical analyzer 130 may determine local standard deviations of grey levels for multiple regions, also referred to as pixel neighborhoods, within the image. The local statistical analyzer 130 may also compare each local standard deviation of grey levels to an average standard deviation of grey levels associated with the image. Based on the comparisons, the local statistical analyzer 130 may identify one or more fibers or fibrils within the image, such as based on determination of one or more local standard deviations of grey levels being outside a threshold range of the average standard deviation of grey levels. In some implementations, the identified fibers or fibrils from the local statistical analyzer 130 may be used to refine or adjust the fiber area determined by the size and shape analyzer 124, the count of edges determined by the edge detector 126, the sum of grey levels determined by the morphological image analyzer 128, or a combination thereof, prior to the values being provided to the fibrillation measurement engine 134. In some other implementations, the identified fibers or fibrils may be used to determine an additional fiber area, or an additional count of edges of fibrils, that is provided to the fibrillation measurement engine 134.

The Hough transform engine 132 may perform one or more Hough transforms on the image, or the sub-images 110, to identify the fibers within the image. To illustrate, the Hough transform engine 132 may perform one or more Hough transforms on the image based on an expected length and/or expected straightness of fibers to identify one or more elements within the image as fibers. In some implementations, the identified fibers from the Hough transform engine 132 may be used to refine or adjust the fiber area determined by the size and shape analyzer 124 prior to the fiber area being provided to the fibrillation measurement engine 134. Such adjustment may distinguish one or more strong fibrils or opaque fibril clusters incorrectly identified as fibers by the size and shape analyzer 124. In some other implementations, the identified fibers may be used to determine an additional fiber area that is provided to the fibrillation measurement engine 134.

The fibrillation measurement engine 134 may calculate the degree of fibrillation 112 based at least in part on the fiber area from the size and shape analyzer 124, the count of edges from the edge detector 126, and the sum of grey levels from the morphological image analyzer 128. In some implementations, the fibrillation measurement engine 134 may determine multiple degree of fibrillation values, also referred to as or corresponding to shape factors, and the fibrillation measurement engine 134 may determine the degree of fibrillation 112 based on the multiple degree of fibrillation values. As a particular example, the fibrillation measurement engine 134 may calculate a first degree of fibrillation based on the fiber area and the count of edges, a second degree of fibrillation based on the fiber area and the sum of grey levels or a fibril area based thereon, and the degree of fibrillation 112 based on an average of the first degree of fibrillation and the second degree of fibrillation, as further described with reference to FIG. 6. In some implementations, the average may be a weighted average based on weights corresponding to priorities of the various image processing techniques used to determine the degree of fibrillation values or other information. In implementations in which the output of the local statistical analyzer 130 and/or the Hough transform engine 132 are provided to the fibrillation measurement engine 134, the fibrillation measurement engine 134 may determine additional degree of fibrillation values based on these outputs, and the additional degree of fibrillation values may be averaged with the first and second degree of fibrillation values to calculate the degree of fibrillation 112. In some implementations, the fibrillation measurement engine 134 may determine the fiber and fibril identification data 114 and/or the fiber and fibril characteristic data 116 based on the outputs of the size and shape analyzer 124, the edge detector 126, and the morphological image analyzer 128, and optionally the outputs of the local statistical analyzer 130 and/or the Hough transform engine 132. For example, the fibrillation measurement engine 134 may identify, and determine characteristics of, fibers, clusters of fibrils attached to fibers, free clusters of fibrils, fibrils attached to fibers, and free fibrils within the image based on the various image processing performed by the image processing engine 122.

For example, the size and shape analyzer 124, the edge detector 126, the morphological image analyzer 128, the local statistical analyzer 130, the Hough transform engine 132, and the fibrillation measurement engine 134 may operate in combination to identify or distinguish features such as fibers, fibrils, etc., that would not be identified or distinguished using only one type of image processing. As an illustrative example, a fiber and an opaque fibril cluster both may be dark, opaque, and have a large relative size within the image, but the fiber and the opaque fibril cluster may have different shapes. To illustrate, the fiber may be elongated, while the opaque fibril cluster is relatively round, such as being "potato"-shaped. When processing an image or sub-image that contains either the fiber or the opaque fibril cluster, edge detection and morphological image processing may detect the presence of a feature, and the edges of the feature, but may not be able to identify the feature type. Local statistical analysis may determine that the feature has a relatively large size and is dark, at least compared to the background, thus identifying the feature as either the fiber or the opaque fibril cluster. Hough transforms and adaptive thresholding/binary processing may distinguish the feature between the fiber and the opaque fibril cluster due to the shape-sensitivity of the Hough transforms and the adaptive thresholding/binary processing including the size and shape analysis. Thus, each of the size and shape analyzer 124, the edge detector 126, the morphological image analyzer 128, the local statistical analyzer 130, and the Hough transform engine 132 may provide a respective detection map according to the criteria they are sensitive to, and the fibril measurement engine 134 may combine the detection maps, using appropriate weighting, to determine identification and/or a map of fibers, clusters of fibrils attached to fibers, free clusters of fibrils, fibrils attached to fibers, and free fibrils within the image.

After determining the degree of fibrillation 112, and optionally the fiber and fibril identification data 114 and/or the fiber and fibril characteristics data 116, the electronic device 102 may generate an output that indicates the degree of fibrillation 112. The output may optionally include the fiber and fibril identification data 114 and/or the fiber and fibril characteristics data 116. In some implementations, the electronic device 102 may initiate display of the output, such as by providing the output to the display device 142 for display to a user, such as via a GUI. The GUI may display the degree of fibrillation 112, information indicated by the fiber and fibril identification data 114, and/or information indicated by the fiber and fibril characteristics data 116. Additionally or alternatively, the output may include a display of the image, optionally with fibers and different types of fibrils labeled based on the fiber and fibril identification data 114. Additionally or alternatively, the electronic device 102 may store the degree of fibrillation 112, and optionally the fiber and fibril identification data 114 and/or the fiber and fibril characteristics data 116, at the memory 106 or an external storage device coupled to the electronic device 102. Additionally or alternatively, the electronic device 102 may provide the network entity 150 via the networks 160 for storage, display, or control of one or more pulp or product manufacturing operations.

In some implementations, the one or more processors 104 may adaptively adjust the processing parameters 118 based on a lighting intensity or other lighting condition associated with the image, a contrast associated with the image, other characteristics of the image, or a combination thereof. The processing parameters 118 may include one or more parameters associated with operation of the size and shape analyzer 124, the edge detector 126, the morphological image analyzer 128, the local statistical analyzer 130, the Hough transform engine 132, or a combination thereof. Adjusting the processing parameters 118 based on the characteristics of the image may improve performance of the image processing for images that are darker or lighter than an average image or an image with desired lighting, contrast, etc., characteristics. As one example, the one or more processors 104 may generate an image histogram of grey levels based on the image or the sub-images 110 and determine a peak of the image histogram. The one or more processors 104 may adjust one or more of the processing parameters 118 based on the peak of the image histogram. For example, the one or more processors 104 may adjust one or more thresholds used to by the size and shape analyzer 124, the edge detector 126, or a combination thereof, to perform adaptive thresholding on the image or the sub-images 110. To illustrate, voids, which correspond to the background, within the image may appear as a peak on a grey level histogram of the image, because the grey level histogram counts the occurrence of each grey level in the image. Because the grey levels may fluctuate from image to image, the location of the peak may be determined and used to adjust one or more thresholds included in the processing parameters 118 for adaptive thresholding performed by the size and shape analyzer 124 and/or the edge detector 126, as further described with reference to FIGS. 3 and 4A-B. Additionally, fluctuations in lighting intensity across images, such as fluctuations due to non-uniformity of a light source, may be compensated by using similar adjustments to the processing parameters 118. In other implementations, other parameters of the processing parameters 118 may be adjusted based on other information to compensate for other conditions.

As described above, the system 100 of FIG. 1 supports automatic determination of the degree of fibrillation 112 of pulp based on an image, such as an image represented by the image data 144, using image processing techniques. For example, the degree of fibrillation 112 may be determined based on performance of size and shape analysis that includes adaptive thresholding and binarization, edge detection, morphological image processing, local statistical analysis, Hough transforms, or a combination thereof. The degree of fibrillation 112 may be more accurate than a degree of fibrillation determined based on a single type of image processing, as each of the different types of image processing may compensate for weaknesses associated with one or more other types of image processing, such as distinguishing between features and the background, between fibers and fibrils, or between clusters of fibrils attached to fibers, free clusters of fibrils, fibrils attached to fibers, and free fibrils. As an example, the size and shape analyzer 124 may identify the darkest parts of the image as part of determining the fiber area, which may correspond to fibers and strong clustered fibrils, and the Hough transform engine 132 may distinguish the fibers from the fibrils based on length and shape using Hough transforms. Thus, the system 100 may determine the degree of fibrillation 112 with improved accuracy and/or precision, as well as distinguishing fibers from clusters of fibrils and free fibrils, as compared to using a single type of image processing. The degree of fibrillation 112 may be used as an indicator of quality of highly fibrillated pulp. For example, the degree of fibrillation 112 may be related to a level of energy associated with the highly fibrillated pulp. Additionally, the system 100 may be configured to adaptively compensate, by changing the processing parameters 118, for differences in lighting, contrast, or other characteristics across multiple images. In this manner, the system 100 may automatically compensate for differences in quality of the images received from the image capture device 140.

Figure 2:
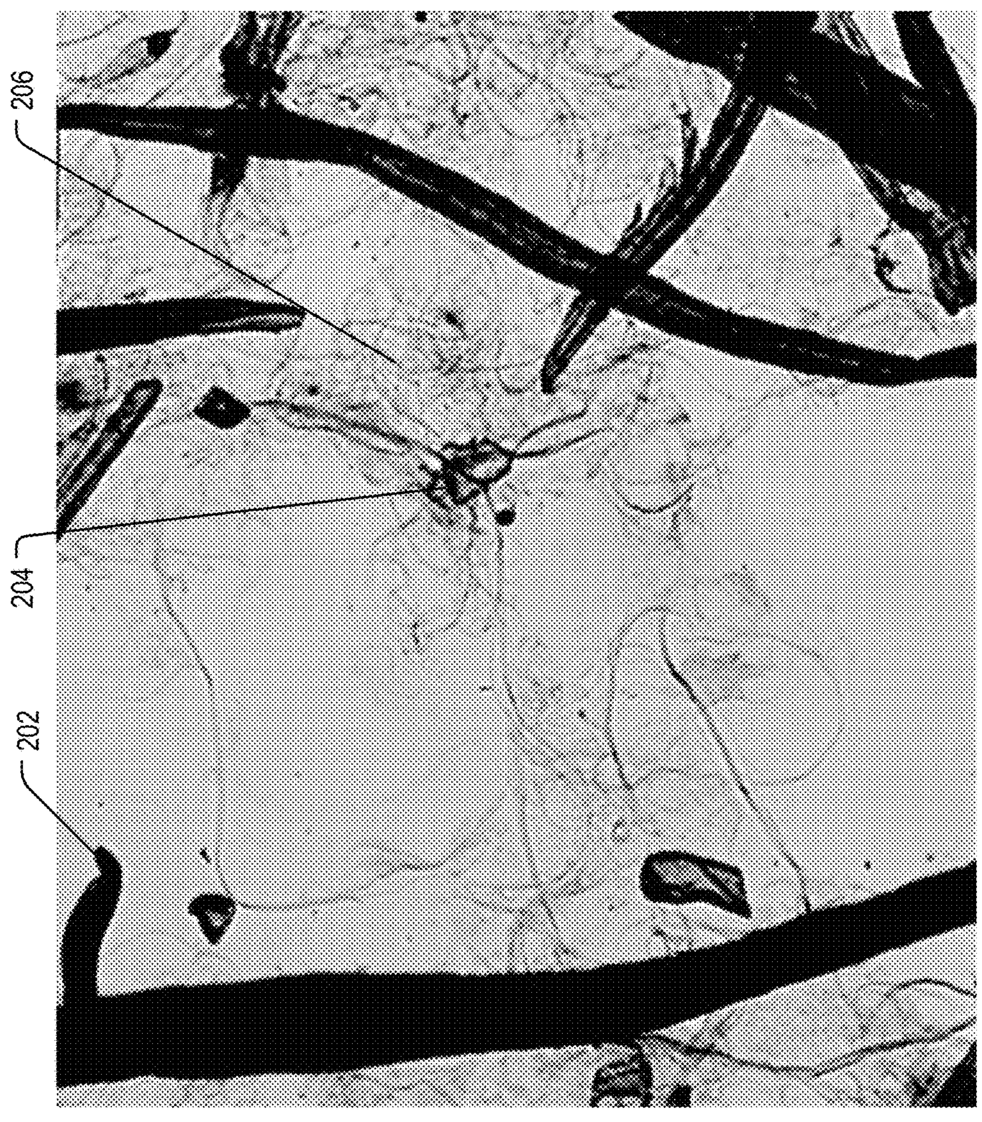
FIG. 2 is an example of an image of pulp that includes fibrillated fibers according to aspects of the present disclosure.

Referring to FIG. 2, an example of an image 200 of pulp that includes fibrillated fibers according to some aspects of the present disclosure is shown. The image 200 may be generated by the image capture device 140 of FIG. 1, such as a microscope or a camera. As shown in FIG. 2, the pulp includes fibers represented by thick, elongated, dark elements, clusters of fibrils represented by large, potato-shaped dark elements, and fibrils represented by thin, dark elements. For example, the pulp may include an illustrative fiber 202, a loose cluster of fibrils 204, and free fibrils 206. For pulp that is highly fibrillated, the number of fibrils may be significantly greater than the number of fibers, as shown in FIG. 2. In some implementations, the pulp may be stained or otherwise dyed such that fibers and fibrils are much darker than the background in the image. As described with reference to FIG. 1, the system 100 may perform various image processing on the image 200 or sub-images of the image 200, such as size and shape analysis that includes adaptive thresholding and binarization, edge detection, morphological image processing, local statistical analysis, Hough transforms, or a combination thereof, to identify the fibers and the different types of fibrils, and to determine a degree of fibrillation associated with the pulp.

Figure 3:
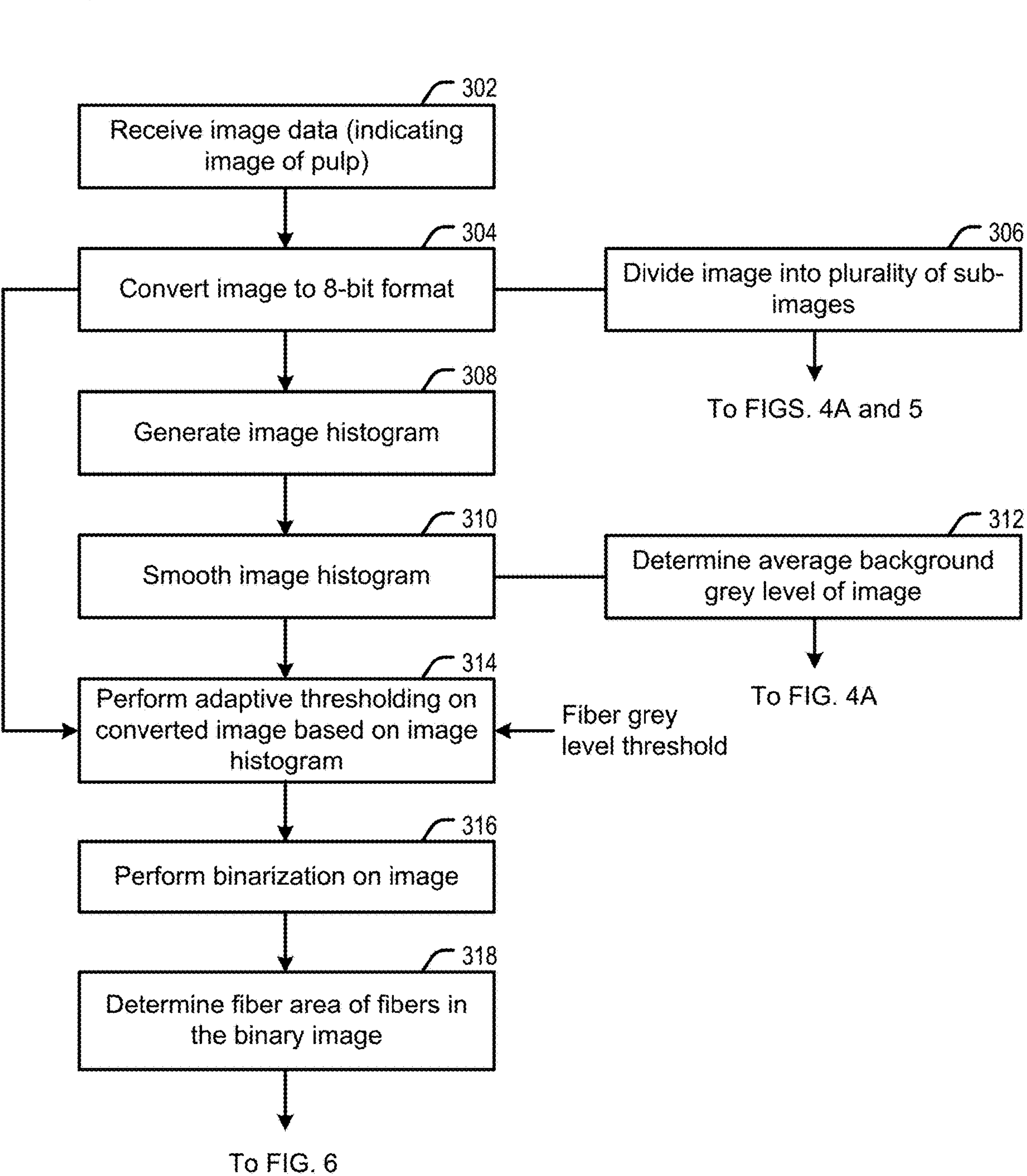
FIG. 3 is a flow diagram illustrating an example of a method for performing size and shape analysis on an image of pulp according to aspects of the present disclosure.

Referring to FIG. 3, a flow diagram of an example of a method for performing size and shape analysis on an image of pulp according to aspects of the present disclosure is shown as a method 300. In some implementations, the operations of the method 300 may be stored as instructions that, when executed by one or more processors, such as the one or more processors of a computer, a mobile device, or another type of electronic device, cause the one or more processors to perform the operations of the method 300. In some implementations, the method 300 may be performed by a computing device, or components thereof, such as the image processing engine 122, including the size and shape analyzer 124, of the electronic device 102 of FIG. 1.

The method 300 includes receiving image data that indicates an image of pulp, at 302. For example, the electronic device 102 may receive the image data 144, which represents one or more images of pulp, from the image capture device 140. The method 300 includes converting the image to an 8-bit format, at 304. For example, the image processing engine 122 may convert the image having an input image format to a converted image having a particular format. In some implementations, the particular format may be an 8-bit grey level format, such as a format having 256 grey levels. The method 300 may also include dividing the image into a plurality of sub-images, at 306. For example, the image processing engine 122 may divide the image into the sub-images 110 of FIG. 1. In some implementations, each sub-image may have a size of 1000×1000 pixels. The sub-images may be used for edge detection and morphological image processing, as further described with reference to FIGS. 4A and 5.

Additionally, after converting the image, the method 300 includes generating an image histogram of grey levels based on the converted image, at 308. For example, the size and shape analyzer 124 may be configured to generate a histogram that counts the number of pixels associated with one or more different grey levels detected within the image. The method 300 includes smoothing the image histogram, at 310. For example, the size and shape analyzer 124 may perform one or more smoothing operations on the image histogram. In some implementations, the one or more smoothing operations may include using a moving average of length three to smooth out small fluctuations in grey level, such as those based on digital noise of the image. The method 300 includes determining an average background grey level of the image, at 312. For example, the size and shape analyzer 124 may determine a peak of the image histogram, and the grey level associated with the peak may be identified as the average background grey level of the image. The average background grey level of the image may be used for edge detection, as further described with reference to FIG. 4A.

Additionally, after smoothing the image histogram, the method 300 includes performing adaptive thresholding on the converted image based on the image histogram and a fiber grey level threshold, at 314. For example, the size and shape analyzer 124 may perform adaptive thresholding on the image by comparing the grey levels from the image histogram to the fiber grey level threshold, and based on the comparison, thresholding pixels of the image. Thresholding the pixels may refer to assigning the pixels to a first group or a second group based on whether the pixel's grey level satisfies the fiber grey level threshold. In such an example, the first group may correspond to the foreground of the image, the second group may correspond to the background of the image, and a pixel grey level may satisfy the fiber grey level threshold if the pixel grey level is greater than or equal to the fiber grey level threshold. The fiber grey level threshold sets the degree of grey level that a pixel should be darker than the background of the image to be identified as a fiber or a strong fibril, as described with reference to FIG. 1. In some implementations, the fiber grey level threshold is a fixed value for all images. In some other implementations, the fiber grey level threshold is adaptively adjusted based on an average background grey level of the image. For example, the fiber grey threshold may be set to a greater value when the average background grey level is greater, and the fiber grey threshold may be set to a smaller value when the average background grey level is less. In this manner, the fiber grey level, which may include or correspond to one of the processing parameters 118 of FIG. 1, may be adaptively adjusted to compensate for differences in lighting across multiple images. The method 300 includes performing binarization on the image, at 316. For example, the size and shape analyzer 124 may generate a binary image in which pixels assigned to the first group/the foreground have a first value representing dark or black and pixels assigned to the second group/the background may have a second value representing light or white. Although described as two separate operations, in other implementations, performing the adaptive thresholding, at 314, may also perform the binarization in order to generate the binary image.

The method 300 further includes determining a fiber area of fibers in the binary image, at 318. For example, groups of adjacent pixels having the first value representing dark or black may correspond to fibers or strong fibrils, thus areas of the groups of adjacent pixels may be summed to determine the fiber area associated with fibers within the image. Although one or more fibrils or debris may be identified in addition to the fibers, as described above with reference to FIG. 1, because the fibers are much larger than the fibrils and debris, the area of the identified groups of pixels may sufficiently approximate the area of fibers within the image. The area may be refined based on additional types of image processing, as described above with reference to FIG. 1. The fiber area may be used in determining a degree of fibrillation of the pulp, as further described with reference to FIG. 6.

Figure 4A:
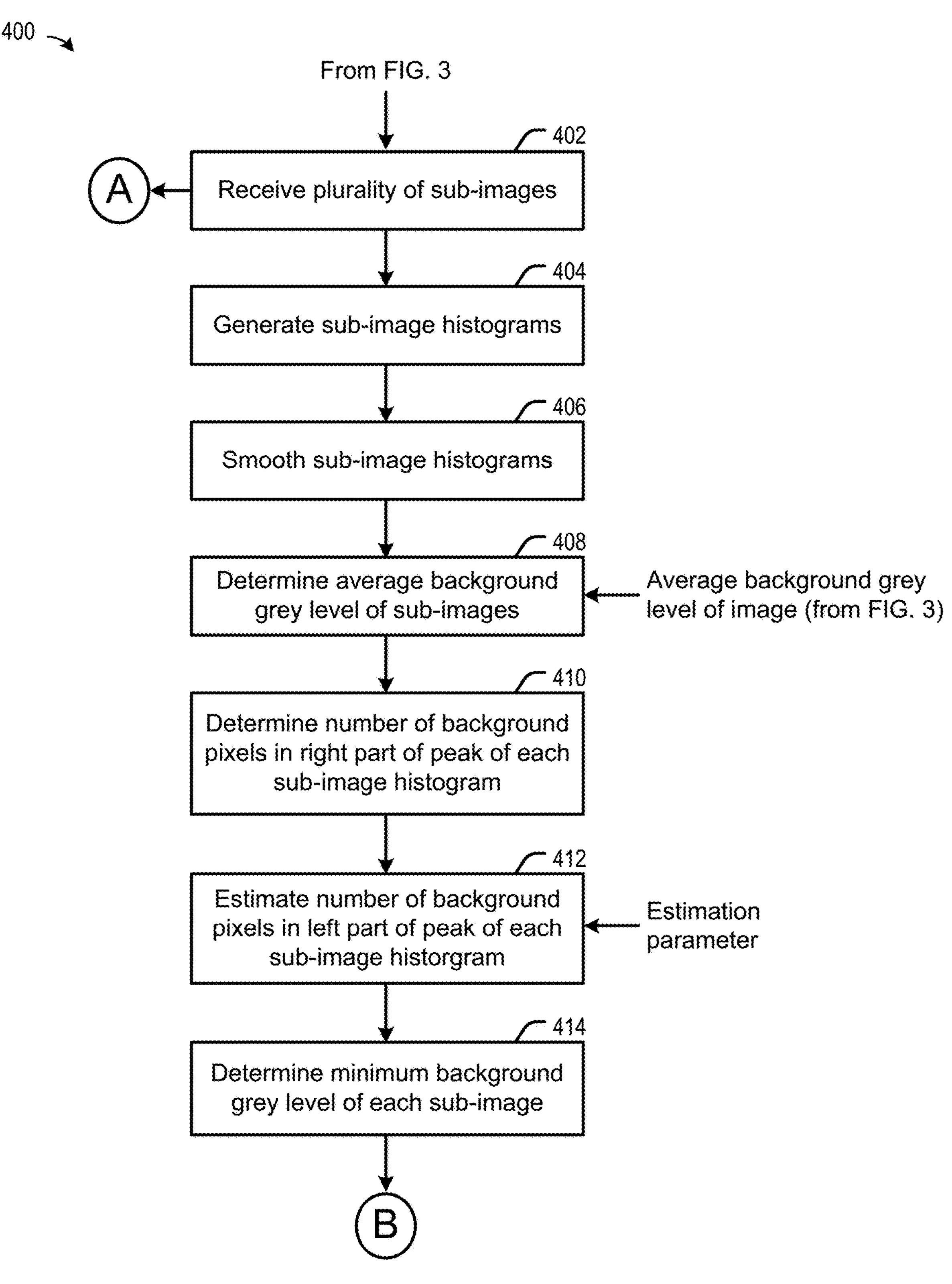
FIGS. 4A-B are a flow diagram illustrating an example of a method for performing edge detection on sub-images of pulp according to aspects of the present disclosure.
Figure 4B:
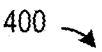

Referring to FIGS. 4A-4B, a flow diagram of an example of a method for performing edge detection on sub-images of pulp according to aspects of the present disclosure is shown as a method 400. In some implementations, the operations of the method 400 may be stored as instructions that, when executed by one or more processors, such as the one or more processors of a computer, a mobile device, or another type of electronic device, cause the one or more processors to perform the operations of the method 400. In some implementations, the method 400 may be performed by a computing device, or components thereof, such as the image processing engine 122, including the edge detector 126, of the electronic device 102 of FIG. 1.

As shown in FIG. 4A, the method 400 includes receiving the plurality of sub-images, at 402. For example, the edge detector 126 may receive the sub-images 110 of FIG. 1. The sub-images may also be used later in the edge detection, such as at A in FIG. 4B. After receiving the plurality of sub-images, the method 400 includes generating sub-image histograms of grey levels for each of the sub-images, at 404. For example, the edge detector 126 may generate, for each sub-image, a histogram that counts pixels associated with different grey levels within the sub-image, similar to as described above with reference to FIG. 3. The method 400 includes smoothing the sub-image histograms, at 406. For example, the edge detector 126 may perform one or more smoothing operations on each sub-image histogram, similar to as described above with reference to FIG. 3. In some implementations, the one or more smoothing operations may include using a moving average of length three to reduce grey level fluctuations due to digital noise or other characteristics of the sub-image. The method 400 includes determining an average background grey level of the sub-images based on the sub-image histograms and the average background grey level of the image, such as the average background grey level determined according to the method 300 of FIG. 3, at 408. For example, the edge detector 126 may, for each sub-image, determine a peak of the sub-image histogram within a particular grey level range, which may be based on the average background grey level of the image, and the grey level associated with the peak may be identified as the average background grey level of the sub-image. Such conditioning of the peak determination may prevent the average background grey level from being identified as the grey level of a fiber for sub-images that are crowded with fibers.

The method 400 includes determining a first number of background pixels in a first portion of the peak of each sub-image histogram, at 410. For example, the edge detector 126 may determine the number of pixels included in a right part of the peak of each sub-image histogram, such as pixels that are clearer than the background mean grey level value for each sub-image. Because these pixels are clearer than the background mean grey level value, they are likely background pixels and should not be used in determining the grey levels of fibrils in the sub-images. Although the difference between grey levels of fibers and grey levels of the background may be significant, fibrils may be more difficult to identify based on grey levels. For example, some strong fibrils may have grey levels similar to those of fibers, while weak fibrils may have grey levels that are much closer to the grey levels of the background. Thus, fibrils may be identified over a wide range of grey levels. Additionally, a pixel having a lower grey level may be a fibril or may be a dark part of the background. For example, the pixel may have a grey level that is within an upper portion of the range of grey levels associated with fibrils or within a lower portion of a range of grey levels associated with the background.

The method 400 includes estimating a second number of background pixels in a second portion of the peaks of the sub-image histograms, at 412. For example, the edge detector 126 may, for each sub-image, estimate a number of pixels in a left part of the peak of the sub-image histogram. In some implementations, the estimated number of pixels may be the same as the number of pixels in the right part of the peak, if the background grey level has a normal distribution around its center value. Because such distribution is typically unlikely, in some other implementations, the edge detector 126 may estimate the second number of pixels by multiplying the first number of pixels by an estimation parameter. The estimation parameter may be set to a value that accounts for the grey level range for fibrils being within a range where the response of the image capture device 140 may not be linear to opacity, and that pixels having the same grey level value may be either fibrils or dark parts of the background. In some implementations, the estimation parameter may be any of, or between any two of, 40%, 44%, 45%, 50%, 55%, or 60%, as non-limiting examples. The estimation parameter may be a user-input value or may be determined by the electronic device 102 based on analysis of multiple images. The method 400 includes determining a minimum background grey level of each sub-image, at 414. For example, the edge detector 126 may, for each sub-image, determine the minimum background grey level as the grey level associated with the estimated second number of pixels. The second number of pixels may be number of pixels estimated to be in the left part of the peak of the sub-image histogram. After determining the minimum background grey level of each sub-image, the method 400 continues to B in FIG. 4B.

As shown in FIG. 4B, the method 400 includes performing adaptive thresholding and binarization on the sub-images based on the minimum background grey levels, at 416. For example, the edge detector 126 may assign pixels associated with a grey level that satisfies the respective minimum background grey level to a first group of pixels that correspond to the background, and the edge detector 126 may assign pixels associated with a grey level that fails to satisfy the respective minimum background grey level to a second group of pixels that correspond to the foreground, similar to as described above with reference to FIG. 3. The minimum background grey level may set the degree of grey level that a pixel should be darker than the background of the sub-image to be identified as a fibril. The edge detector 126 may also generate binary sub-images based on the assignment of pixels to the two groups, as described above with reference to FIG. 3. The method 400 includes applying low-pass filters to the binary sub-images to generate filtered binary sub-images, at 418. For example, the edge detector 126 may, for each binary sub-image, apply a low pass filter based on a filter pixel threshold to filter out any groups of pixels that fail to satisfy the pixel threshold. For example, one or more sub-images may include specks, dust, or other small particles that are thresholded based on the adaptive thresholding at 416, and applying the low pass filter may remove these undesired features. In some implementations, the pixel threshold may be 13 pixels, which corresponds approximately to the area of a disk having a radius of two pixels. In other implementations, the pixel threshold may be a different value, such as a user-input value or an automatically determined value by the electronic device 102 based on analysis of multiple images.

The method 400 includes dilating the binary sub-images, at 420, and subtracting the sub-images from the dilated binary images, at 422. For example, the edge detector 126 may dilate the binary sub-images, such as using a 3×3 kernel, to generate dilated binary sub-images, and the edge detector 126 may subtract the respective binary sub-image from the dilated binary sub-image to generate "edge sub-images," such as processed binary sub-images for use in edge detection. Subtracting the binary sub-image may be performed by subtracting features of the binary sub-image. The method 400 includes constructing a final edge image, at 424. For example, the edge detector 126 may combine the edge sub-images or the processed binary sub-images to form a single "edge image," such as a processed binary image for performing edge detection. The method 400 further includes determining a count of edges of fibrils within the image, at 426. For example, the edge detector 126 may perform edge detection on the edge image to identify edges of features within the edge image. The features may correspond to fibrils and fibers. The edge detector 126 may also determine the count of edges of fibrils based on the identified fibrils and/or fibers. For example, the edge detector 126 may determine a sum of lengths of the identified fibrils and/or fibers to determine the count of edges, such that the count of edges corresponds to a total perimeter of all identified fibrils and/or fibers. As described above with reference to FIG. 1, because the number of fibrils may be substantially greater than the number of fibers in highly fibrillated pulp, the count of edges may approximate the perimeter of the fibrils within the pulp. Additionally, the count of edges may be refined by other image processing techniques, as described above with reference to FIG. 3. The count of edges may be used in determining a degree of fibrillation of the pulp, as further described with reference to FIG. 6.

Figure 5:
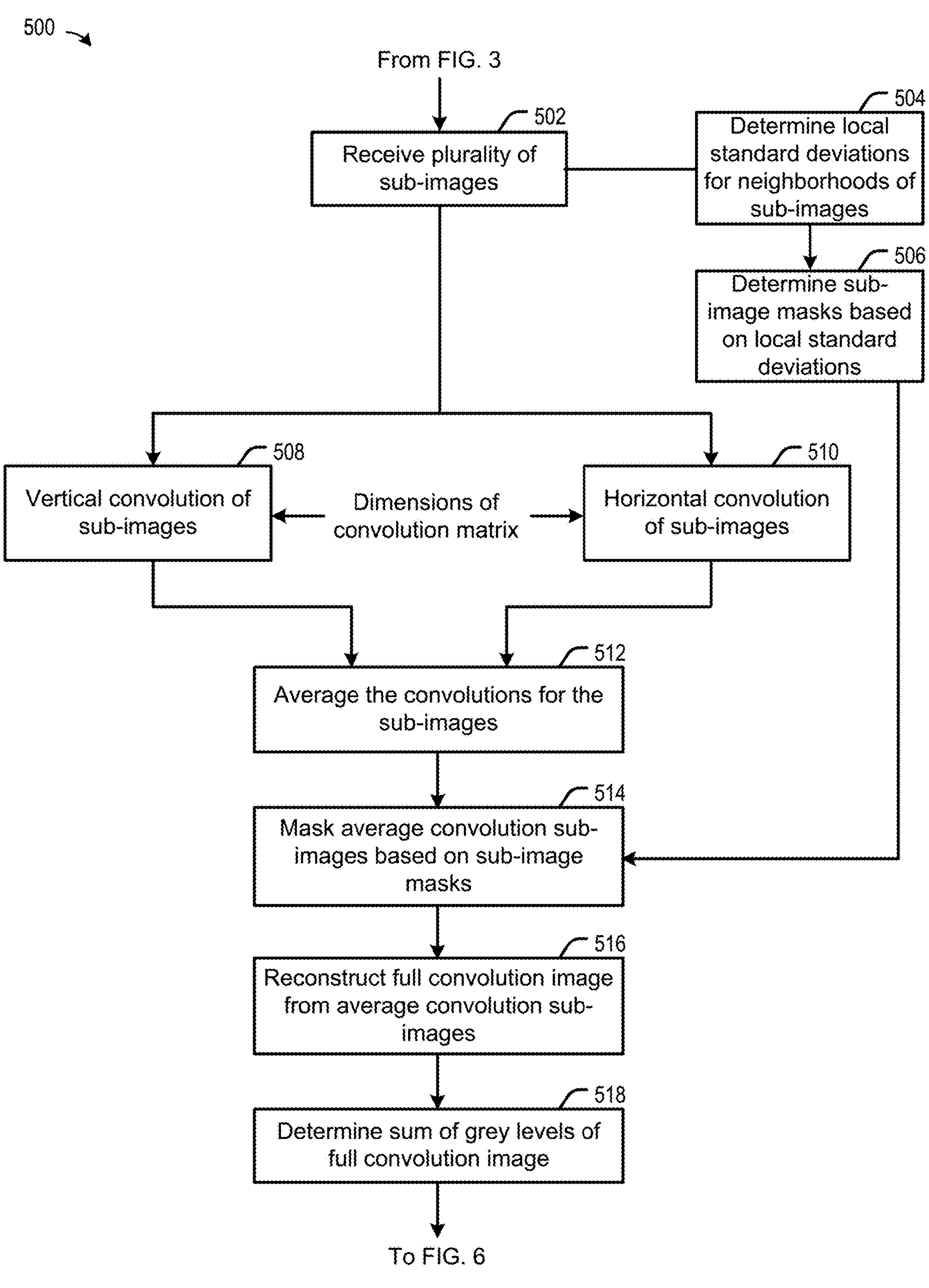
FIG. 5 is a flow diagram illustrating an example of a method for performing morphological image processing on sub-images of pulp according to aspects of the present disclosure.

Referring to FIG. 5, a flow diagram of an example of a method for performing morphological image processing on sub-images of pulp according to aspects of the present disclosure is shown as a method 500. In some implementations, the operations of the method 500 may be stored as instructions that, when executed by one or more processors, such as the one or more processors of a computer, a mobile device, or another type of electronic device, cause the one or more processors to perform the operations of the method 500. In some implementations, the method 500 may be performed by a computing device, or components thereof, such as the image processing engine 122, including the morphological image analyzer 128, of the electronic device 102 of FIG. 1.

The method 500 includes receiving the plurality of sub-images, at 502. For example, the morphological image analyzer 128 may receive the sub-images 110 of FIG. 1. The method 500 continues to 508 and to 510. In some implementations, the method 500 includes determining local standard deviations of grey levels within the sub-images, at 504. For example, the morphological image analyzer 128 may determine, for one or more neighborhoods, the local standard deviation of grey levels for particular areas of pixels. In some implementations, the particular areas may include or correspond to a disk covering approximately a 7×7 pixel area. The method 500 includes determining sub-image masks based on the local standard deviations of grey levels, at 506. For example, the morphological image analyzer 128 may generate masks for the areas associated with a local standard deviation of grey levels that fails to satisfy a threshold, such as by being less than the threshold. Such areas may represent background or the interior of a large fiber, which do not contribute to fibrils, and thus can be masked to improve precision of the fibril area determination, as further described herein.

The method 500 includes convolving the sub-images based on an expected fibril width in a vertical direction to generate vertical convolution sub-images, at 508, and convolving the sub-images based on the expected fibril width in a horizontal direction to generate horizontal convolution sub-images, at 510. For example, the morphological image analyzer 128 may convolve the sub-images 110 in the vertical direction based on a convolution matrix having particular dimensions, and the morphological image analyzer 128 may convolve the sub-images 110 in the horizontal direction based on a convolution matrix having the particular dimensions. The dimensions, and the values, of the convolutional matrix may be based on the expected fibril width. In some implementations, the convolution matrix may be a half-hat, 7×7 matrix that includes the following values:

$$\begin{bmatrix} -1 & -1 & -1 & 0 & 1 & 1 & 1 \\ -1 & -1 & -1 & 0 & 1 & 1 & 1 \\ -1 & -1 & -1 & 0 & 1 & 1 & 1 \\ -1 & -1 & -1 & 0 & 1 & 1 & 1 \\ -1 & -1 & -1 & 0 & 1 & 1 & 1 \\ -1 & -1 & -1 & 0 & 1 & 1 & 1 \\ -1 & -1 & -1 & 0 & 1 & 1 & 1 \end{bmatrix}$$

The cross section of this matrix has a half-hat shape. The convolution operations include multiplying a same-size neighborhood of each pixel by the convolution matrix. The corresponding result is highest when the shape of a feature that includes the pixel matches the shape of the convolution filter, which in this case is an edge. Thus, the morphological image processing may detect edges of features, such as fibers, fibrils, and debris. In other implementations, the convolution matrix may have different dimensions, such as 3×3, 5×5, 9×9, or 19×19, as non-limiting examples. In some other implementations, the convolution matrix may have non-square dimensions. Decreasing the dimensions of the convolution matrix may increase the sensitivity to smaller features, and increasing the dimensions may reduce the sensitivity to smaller features. In some other implementations, a different convolutional matrix may be used, such as a full-hat matrix or a matrix representing a different function. Performing convolution in both the horizontal direction and the vertical direction may detect horizontal edges and vertical edges, in addition to partially detecting edges having other orientations. In some other implementations, additional orientations of convolutions may be performed to increase the precision of the edge detection, at the expense of additional processing.

After generating the vertical convolution sub-images and the horizontal convolution sub-images, the method 500 includes averaging the convolutions for sub-images, at 512. For example, the morphological image analyzer 128 may determine, for each sub-image, an average convolution sub-image by averaging an absolute value of the respective vertical convolution sub-image and an absolute value of the respective horizontal convolution sub-image. Averaging the absolute values of the convolution sub-images identifies fibrils based on an intensity in a change from background pixel to edge of fibril pixel, or from edge of fibril pixel to background pixel, which may be either positive or negative. The method 500 includes masking the average convolution sub-images based on the sub-image masks, at 514. For example, the morphological image processor 128 may mask each average convolution sub-image based on respective sub-image masks, determined at 506, to remove undesired features from the average convolution sub-images. Although shown in FIG. 5, in some other implementations, the operations of 504, 506, and 514 may be optional.

The method 500 includes reconstructing a full convolution image based on the average convolutional sub-images, at 516. For example, the morphological image analyzer 128 may combine the average convolution sub-images, after masking, to construct a full convolution image. The method 500 further includes determining a sum of grey levels of fibrils within the full convolutional image, at 518. For example, the morphological image analyzer 128 may determine a sum of grey levels associated with the edges of the identified features in the full convolution image, which correspond to fibrils and fibers. The sum of grey levels may be used to determine an area of the fibrils and fibers, and the area of the fibrils may be used in determining a degree of fibrillation of the pulp, as further described with reference to FIG. 6.

Although morphological image processing has been described with reference to the method 500, in some other implementations, the morphological image processing including the convolution operations may be replaced with other types of image processing. As one example, the morphological image processing may be replaced with local standard deviation of grey level analysis. Such analysis may be performed for a disk having a radius of three to five pixels, or other sizes, to detect edges of features. Although such local statistical analysis may also detect edges, the local statistical analysis may be less specific and more sensitive to small, shapeless debris or imperfections in the image. Alternatively, the method 500 may include morphological image processing, as described above, and local statistical analysis may be performed to refine the results of the morphological image processing.

Figure 4B:
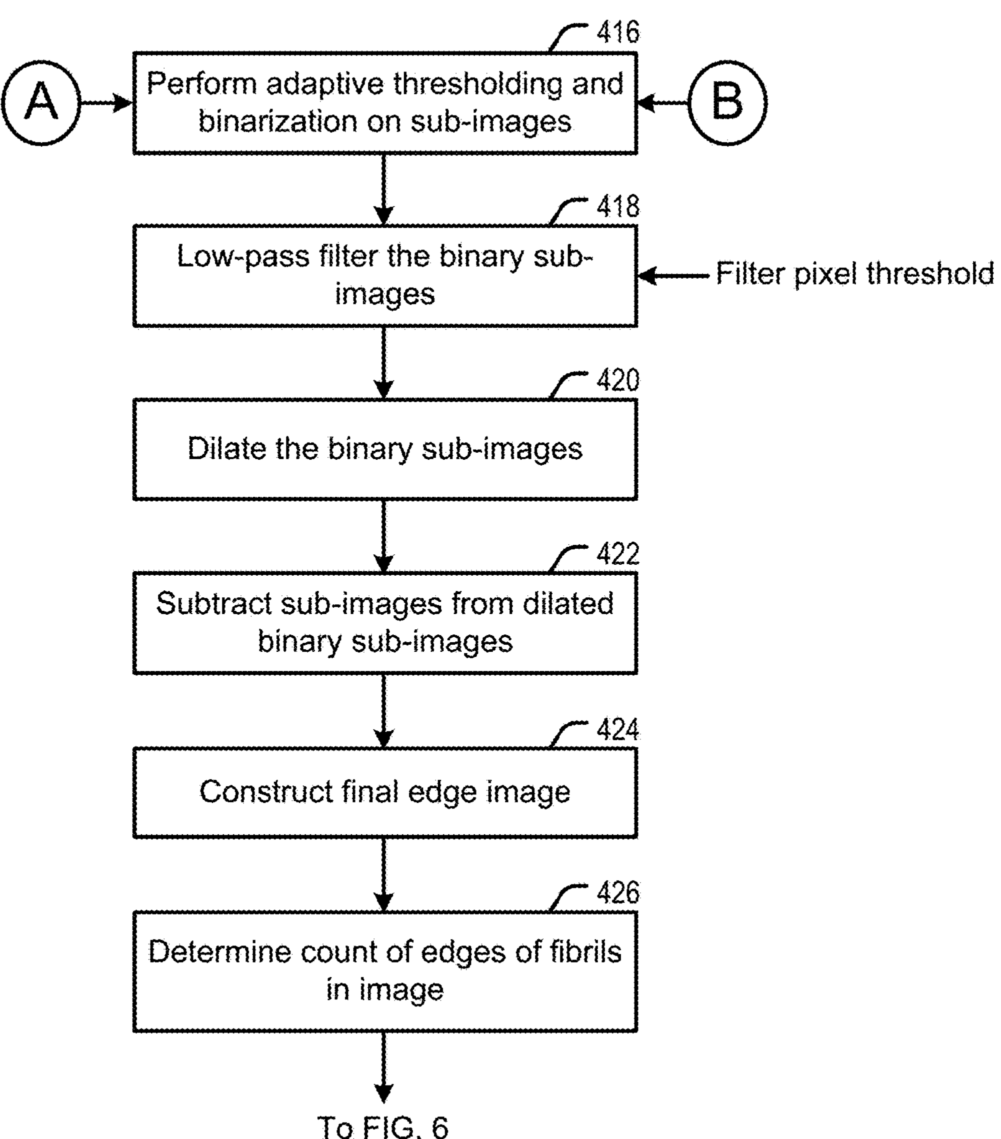
Figure 6:
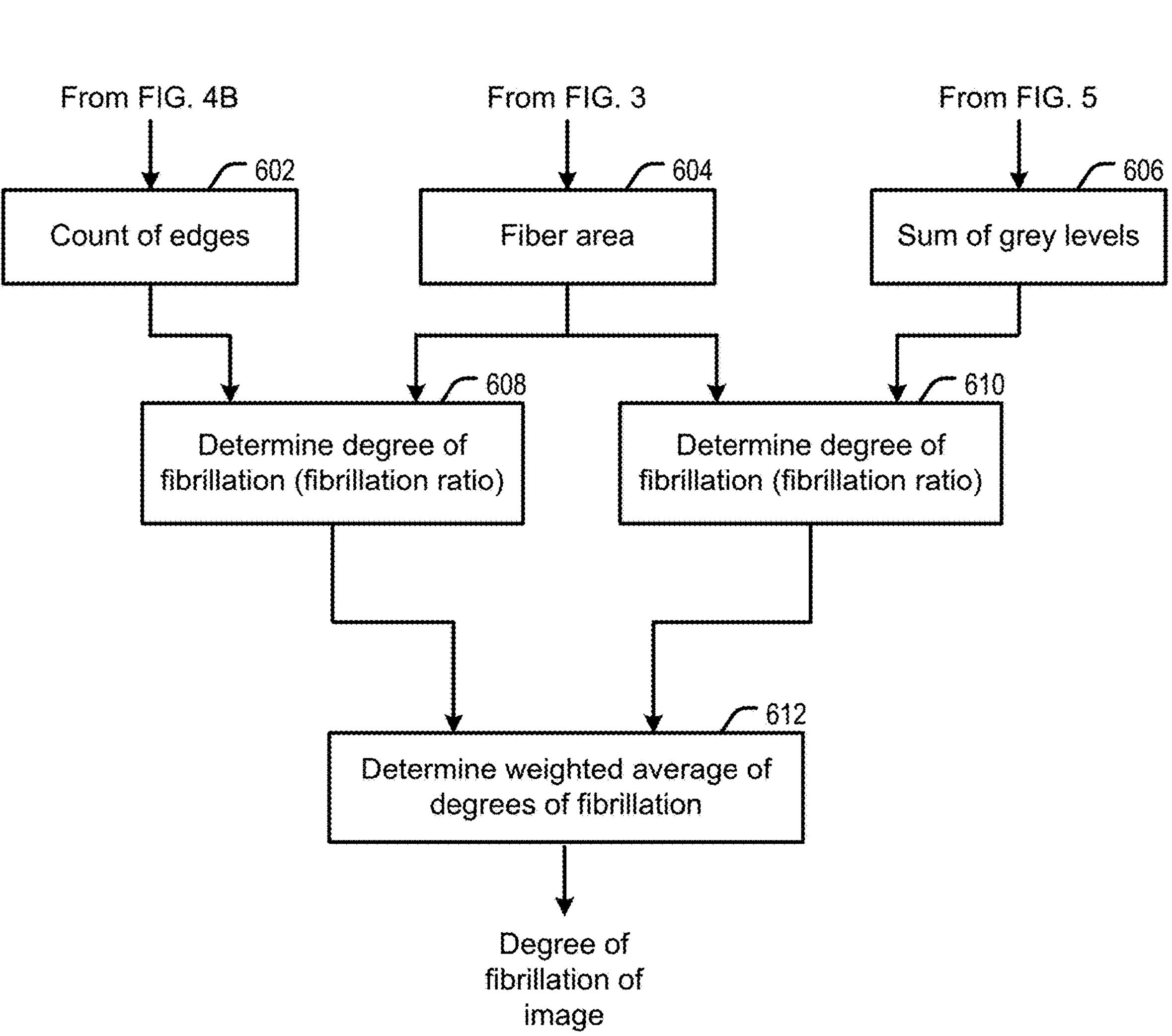
FIG. 6 is a flow diagram illustrating an example of a method for determining a degree of fibrillation within pulp based on outputs of the methods of FIGS. 3-5 according to aspects of the present disclosure.

Referring to FIG. 6, a flow diagram of an example of a method for determining a degree of fibrillation within pulp based on outputs of the methods 300, 400, and 500 of FIGS. 3-5 according to aspects of the present disclosure is shown as a method 600. In some implementations, the operations of the method 600 may be stored as instructions that, when executed by one or more processors, such as the one or more processors of a computer, a mobile device, or another type of electronic device, cause the one or more processors to perform the operations of the method 600. In some implementations, the method 600 may be performed by a computing device, or components thereof, such as the fibrillation measurement engine 134 of the electronic device 102 of FIG. 1.

The method 600 includes receiving a count of edges, at 602. For example, the fibrillation measurement engine 134 may receive the count of edges from the edge detector 126, which may be determined based on the method 400 of FIGS. 4A-B. The method 600 includes receiving a fiber area, at 604. For example, the fibrillation measurement engine 134 may receive the fiber area from the size and shape analyzer 124, which may be determined based on the method 300 of FIG. 3. The method 600 includes receiving a sum of grey levels, or fibril area based on the sum of grey levels, at 606. For example, the fibrillation measurement engine 134 may receive the fibril area based on the sum of grey levels from the morphological image analyzer 128, which may be determined based on the method 500 of FIG. 5.

The method 600 includes determining a first degree of fibrillation, including or corresponding to a first fibrillation ratio, at 608. For example, the fibrillation measurement engine 134 may calculate a first degree of fibrillation based on the fiber area and the count of edges. In some implementations, the fibrillation measurement engine 134 may calculate the first degree of fibrillation by dividing the count of edges, such as a total perimeter of fibrils within the image identified by the method 400 of FIGS. 4A-B, by a square root of the fiber area. Such calculation may represent a shape factor associated with the fibrils, which approximates or corresponds to a degree of fibrillation of the pulp. The method 600 includes determining a second degree of fibrillation, including or corresponding to a second fibrillation ratio, at 610. For example, the fibrillation measurement engine 134 may calculate a second degree of fibrillation based on the fiber area and the sum of grey areas, or the fibril area based on the sum of grey levels. In some implementations, the fibrillation measurement engine 134 may calculate the second degree of fibrillation by dividing the fibril area, which may be based on the sum of grey levels determined by the method 500 of FIG. 5, by the fiber area. Such calculation may represent a shape factor associated with the fibrils, which approximates or corresponds to a degree of fibrillation of the pulp.

The method 600 further includes determining a weight average of the degrees of fibrillation, at 612. For example, the fibrillation measurement engine 134 may calculate the degree of fibrillation 112 as a weight average of the first degree of fibrillation and the second degree of fibrillation. The weights of the first degree of fibrillation and the second degree of fibrillation may be based on priorities of the respective image processing techniques used to determine the respective degree of fibrillation, estimated accuracies associated with the image processing techniques, other information, or a combination thereof. The final calculated degree of fibrillation may be output for display to a user or for use in controlling a pulp or product manufacturing process, as described above with reference to FIG. 1. Additionally or alternatively, the method 600 may include determining the fiber and fibril identification data 114, the fiber and fibril characteristics data 116, or both, based on values determined by performance of the method 300 of FIG. 3, the method 400 of FIGS. 4A-B, and/or the method 500 of FIG. 5, as described above with reference to FIG. 1.

In some implementations, additional operations may be performed in accordance with the method 300 of FIG. 3, the method 400 of FIGS. 4A-B, the method 500 of FIG. 5, the method 600 of FIG. 6, or a combination thereof. Such additional operations may be performed by the local statistical analyzer 130 or the Hough transform engine 132 of FIG. 1. The additional operations may improve the accuracy of the degree of fibrillation determined during operation of the method 600 of FIG. 6, which may include or correspond to the degree of fibrillation 112 of FIG. 1.

To illustrate local statistical analysis operations that may be performed, the local statistical analyzer 130 may perform local statistical analysis, including analysis of standard deviations of grey levels for pixel neighborhoods, to identify fibers or fibrils within the image or sub-images. The identified fibers may be used to refine or adjust the fiber area, the identified fibrils may be used to refine the count of edges or the fibril area based on the sum of grey levels, or a combination thereof. As one example, after performing the method 300 of FIG. 3, the fiber area may be adjusted based on an area of the identified fibers from the local statistical analysis, such as by determining a weighted average of fiber areas from the size and shape analysis and the local statistical analysis. As another example, after performing the method 400 of FIGS. 4A-B, the count of edge may be adjusted based on edges of the identified fibrils from the local statistical analysis, such as by determining a weighted average of counts of edges from the edge detection and the local statistical analysis. Similar operations may be performed for the fibril area determined based on the sum of grey levels generated by performing the method 500 of FIG. 5. Alternatively, the fiber area and the count of edges based on the results of the local statistical processing may be used during performance of the method 600 of FIG. 6. For example, a third degree of fibrillation may be determined based on these fiber areas and counts of edges, and the third degree of fibrillation may be included in the weighted average used to determine the final degree of fibrillation.

To illustrate Hough transform-related operations that may be performed, the Hough transform engine 132 may perform Hough transforms on the image to identify fibers within the image or sub-images. The identified fibers may be used to refine or adjust the fiber area. For example, after performing the method 300 of FIG. 3, the fiber area may be adjusted based on an area of the identified fibers from the Hough transforms, such as by determining a weighted average of fiber areas from the size and shape analysis and the Hough transforms. Alternatively, the fiber area based on the results of the Hough transforms may be used during performance of the method 600 of FIG. 6. For example, a fourth degree of fibrillation may be determined based on this fiber area and the counts of edges from the edge detection and/or a fifth degree of fibrillation may be determined based on this fiber area and the fibril area based on the sum of grey levels from the morphological image processing, and the fourth degree of fibrillation and/or the fifth degree of fibrillation may be included in the weighted average used to determine the final degree of fibrillation.

Referring to FIG. 7, a flow diagram of an example of a method for determining a degree of fibrillation within pulp using image processing according to aspects of the present disclosure is shown as a method 700. In some implementations, the operations of the method 700 may be stored as instructions that, when executed by one or more processors, such as the one or more processors of a computer, a mobile device, or another type of electronic device, or a digital microscope or other image capture device, cause the one or more processors to perform the operations of the method 700. In some implementations, the method 700 may be performed by a computing device, such as the electronic device 102 of FIG. 1, which may include or correspond to a computer device configured for determining fibril and fiber characteristics of pulp.

The method 700 includes receiving, by one or more processors, image data indicating an image of pulp, at 702. For example, the one or more processors may include or correspond to the processors 104, and the image data may include or correspond to the image data 144 of FIG. 1. Although described with respect to one image, the method 700 may also be performed for multiple images, and the results for each image may be averaged or otherwise aggregated to generate a final output.

The method 700 includes dividing, by the one or more processors, the image into a plurality of sub-images, at 704. For example, the plurality of sub-images may include or correspond to the sub-images 110. The method 700 includes performing, by the one or more processors, size and shape analysis on the image to determine a fiber area of fibers within the image, at 706. For example, the size and shape analysis may be performed by the size and shape analyzer 124 of FIG. 1.

The method 700 includes performing, by the one or more processors, edge detection on the plurality of sub-images to determine a count of edges of fibrils within the image, at 708. For example, the edge detection may be performed by the edge detector 126 of FIG. 1. The method 700 includes performing, by the one or more processors, morphological image processing on the plurality of sub-images to determine a sum of grey levels associated with the fibrils within the image, at 710. For example, the morphological image processing may be performed by the morphological image analyzer 128 of FIG. 1.

The method 700 includes calculating, by the one or more processors, a degree of fibrillation associated with the pulp based at least in part on the fiber area, the count of edges of the fibrils, and the sum of grey levels associated with the fibrils, at 712. For example, the calculation may be performed by the fibrillation measurement engine 134 of FIG. 1. The method 700 further includes initiating, by the one or more processors, display of an output that indicates the degree of fibrillation, at 714. For example, the degree of fibrillation may include or correspond to the degree of fibrillation 112 of FIG. 1.

In some implementations, the method 700 may also include determining local standard deviations of grey levels for multiple regions within the image, comparing, for each of the multiple regions, a respective local standard deviation of grey levels to an average deviation of grey levels associated with the image, identifying one or more regions of the multiple regions that correspond to fibers, fibrils, or a combination thereof, based on the comparisons, and refining the fiber area, the count of edges, the sum of grey levels, or a combination thereof, based on the identified fibers, the identified fibrils, or a combination thereof. For example, determining the local standard deviations of grey levels and other such operations may be performed by the local statistical analyzer 130 of FIG. 1. Additionally or alternatively, the method 700 may further include performing a Hough transform on the image to distinguish one or more fibers from other elements within the image, and prior to calculating the degree of fibrillation, refining the fiber area based on the one or more distinguished fibers. For example, the Hough transform may be applied to the image by the Hough transform engine 132 of FIG. 1.

In some implementations, performing the size and shape analysis on the image may include converting the image to a converted image associated with a format having 8-bit grey levels, generating an image histogram of grey levels based on the converted image, performing adaptive thresholding on the converted image based on the image histogram, performing binarization on the converted image to generate a binary image, identifying the fibers within the image based on the binary image, and determining the fiber area associated with the fibers. For example, image conversion, generating the image histogram, performing the adaptive thresholding, performing the binarization, identifying the fibers, and determining the fiber area may be performed as described with reference to FIG. 3.

In some implementations, performing the edge detection on the plurality of sub-images may include, for one or more sub-images of the plurality of sub-images, generating a sub-image histogram of grey levels based on the sub-image, determining an average background grey level associated with the sub-image based on the sub-image histogram, determining a first number of background pixels in a first portion of a peak of the sub-image histogram, estimating a second number of background pixels in a second portion of the peak of the sub-image histogram, and determining a minimum grey level associated with the sub-image based on the average background grey level, the first number of background pixels, and the second number of background pixels. For example, such operations may be performed as described with reference to FIG. 4A. In some such implementations, the first portion of the peak is to the right of the peak in the sub-image histogram, the second portion of the peak is to the left of the peak in the sub-image histogram, and the second number of background pixels is less than the first number of background pixels, such as approximately any of, or between any two of, 40%, 44%, 45%, 50%, 55%, or 60%, as non-limiting examples, of the first number of background pixels. Additionally or alternatively, performing the edge detection on the plurality of sub-images further may also include, for the one or more sub-images, performing adaptive thresholding on the sub-image based on the minimum grey level associated with the sub-image, performing binarization on the sub-image to generate a binary sub-image, applying a low-pass filter to the binary sub-image to generate a filtered binary sub-image, dilating the filtered binary sub-image to generate a dilated binary sub-image, and subtracting the sub-image from the dilated binary sub-image to generate an edge sub-image. The edge detection may further include constructing an edge image based on the edge sub-images, performing edge detection on the edge image to identify edges of fibrils within the image, and determining a count of edges of the fibrils within the image based on the detected edges of the fibrils. For example, such operations may be performed as described with reference to FIG. 4B.

In some implementations, performing the morphological image processing on the plurality of sub-images may include, for each sub-image of the plurality of sub-images, convolving the sub-image based on an expected fibril width in a vertical direction to generate a vertical convolution sub-image, convolving the sub-image based on the expected fibril width in a horizontal direction to generate a horizontal convolution sub-image, and determining an average convolution sub-image based on the absolute value of the vertical convolution sub-image and the absolute value of the horizontal convolution sub-image. For example, such operations may be performed as described with reference to FIG. 5. In some such implementations, performing the morphological image processing on the plurality of sub-images may further include reconstructing a full convolution image based on the average convolutional sub-image of each of the plurality of sub-images, and determining the sum of grey levels associated with the fibrils within the image based on the full convolution image. In some such implementations, performing the morphological image processing on the plurality of sub-images may also include, for each of the plurality of sub-images, determining local standard deviations of grey levels for multiple regions within the sub-image, identifying one or more regions of the multiple regions that are associated with a corresponding local standard deviation of grey levels that fail to satisfy a threshold, and masking the identified one or more regions from the average convolution sub-image prior to constructing the full convolution image. For example, such operations may be performed as described with reference to FIG. 5.

In some implementations, calculating the degree of fibrillation associated with the pulp may include calculating a first degree of fibrillation based on the fiber area and the count of edges of the fibrils, calculating a second degree of fibrillation based on the fiber area and the sum of grey levels associated with the fibrils, and calculating the degree of fibrillation based on a weighted average of the first degree of fibrillation and the second degree of fibrillation. For example, such operations may be performed as described with reference to FIG. 6. In some such implementations, the first degree of fibrillation may indicate a shape factor associated with the fibrils within the image, the count of edges may correspond to a total perimeter of the fibrils within the image, and calculating the first degree of fibrillation may include dividing the total perimeter of the fibrils by a square root of the fiber area. Additionally or alternatively, the second degree of fibrillation may indicate a second shape factor associated with fibrils within the image, and calculating the second degree of fibrillation may further include determining areas of the fibrils within the image based on the sum of grey levels, determining a total area of the fibrils within the image based on the areas of the fibrils, and dividing the total area of the fibrils by the fiber area.

In some implementations, the method 700 may further include adaptively adjusting one or more parameters associated with the size and shape analysis, the edge detection, the morphological image processing, or a combination thereof, based on a lighting intensity associated with the image, a contrast associated with the image, or a combination thereof. For example, the one or more processors 104 may adaptively adjust one or more of the processing parameters 118 based on a lighting intensity associated with the image, a contrast associated with the image, other characteristics of the image, or a combination thereof. In some such implementations, adaptively adjusting the one or more parameters may include generating an image histogram of grey levels based on the image or a sub-image, determining a peak of the image histogram, and adjusting, based on the peak of the image histogram, one or more thresholds used to perform adaptive thresholding on the image or the sub-image.

In some implementations, the method 700 may also include identifying one or more fibers, one or more fibril clusters attached to fibers, one or more free fibril clusters, one or more fibrils attached to fibers, one or more free fibrils, or a combination thereof, based at least in part on the fiber area, the count of edges of the fibrils, and the sum of grey levels associated with the fibrils. In such implementations, the method 700 may further include determining lengths, widths, distribution of sizes, or a combination thereof, associated with the one or more fibers, the one or more fibril clusters attached to fibers, the one or more free fibril clusters, the one or more fibrils attached to fibers, the one or more free fibrils, or a combination thereof. For example, the fibrillation measurement engine 134 may determine the fiber and fibril identification data 114 and/or the fiber and fibril characteristics data 116 based at least in part on the fiber area, the count of edges, and the sum of grey levels, as described with reference to FIG. 1.

The method 700 thus enables determination of a degree of fibrillation within pulp using image processing of one or more images of the pulp. Because the method 700 includes performing multiple image processing techniques, the degree of fibrillation determined may be more accurate and/or precise than a degree of fibrillation determined using a single image processing technique. The degree of fibrillation may be used to determine a quality of pulp, or to control one or more aspects of a pulp, or pulp product, manufacturing process.

It is noted that other types of devices and functionality may be provided according to aspects of the present disclosure and discussion of specific devices and functionality herein have been provided for purposes of illustration, rather than by way of limitation. It is also noted that the methods 300-700 of FIGS. 3-7 may also include other functionality or operations consistent with the description of the operations of the system 100 of FIG. 1.

In some implementations, the methods 300-700 of FIGS. 3-7 may be performed by a processor executing instructions stored on a non-transitory computer-readable storage device. For example, the system 100 may include a controller that includes a processor and a memory. The controller may be configured to enable the components of the respective system to perform the operations described herein. In some implementations, the controller may be distributed across one or more components of the respective system. The controller may be configured to execute instructions stored at the memory, or at a separate storage device, to perform the operations of the methods 300-700 of FIGS. 3-7.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein relating to FIGS. 1-7 may comprise processors, electronics devices, hardware devices, electronics components, logical circuits, memories, software codes, firmware codes, etc., or any combination thereof. In addition, features discussed herein relating to FIGS. 1-7 may be implemented via specialized processor circuitry, via executable instructions, and/or combinations thereof. Additionally or alternatively, one or more operations described with reference to a particular figure may be optional, may be performed in a different order, and/or may be performed with operations described with reference to one or more other figures. For example, one or more operations of the methods 300-600 of FIGS. 3-6 may be performed during performance of the method 700 of FIG. 7.

As used herein, various terminology is for the purpose of describing particular implementations only and is not intended to be limiting of implementations. For example, as used herein, an ordinal term, such as "first," "second," "third," etc., used to modify an element, such as a structure, a component, an operation, etc., does not by itself indicate any priority or order of the element with respect to another element, but rather merely distinguishes the element from another element having a same name, but for use of the ordinal term. The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps, such as the logical blocks in FIGS. 1-7, described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CDROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means-plus- or step-plus-function limitations, unless such a limitation is explicitly recited in a given claim using the phrases "means for" or "step for," respectively.

Although the aspects of the present disclosure and their advantages have been described in detail, it should be understood that various changes, substitutions and alterations can be made herein without departing from the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for determining a degree of fibrillation within pulp using image processing, the method comprising:

receiving, by one or more processors, image data indicating an image of pulp;

dividing, by the one or more processors, the image into a plurality of sub-images;

performing, by the one or more processors, size and shape analysis on the image to determine a fiber area of fibers within the image by:

converting the image to a converted image associated with a format having 8-bit grey levels;

generating an image histogram of grey levels based on the converted image;

performing adaptive thresholding on the converted image based on the image histogram;

performing binarization on the converted image to generate a binary image;

identifying the fibers within the image based on the binary image; and determining the fiber area associated with the fibers;

performing, by the one or more processors, edge detection on the plurality of sub-images to determine a count of edges of fibrils within the image;

performing, by the one or more processors, morphological image processing on the plurality of sub-images to determine a sum of grey levels associated with the fibrils within the image;

calculating, by the one or more processors, a degree of fibrillation associated with the pulp based at least in part on the fiber area, the count of edges of the fibrils, and the sum of grey levels associated with the fibrils; and initiating, by the one or more processors, display of an output that indicates the degree of fibrillation.

2. The method of claim 1, further comprising:

determining local standard deviations of grey levels for multiple regions within the image;

comparing, for each of the multiple regions, a respective local standard deviation of grey levels to an average deviation of grey levels associated with the image;

identifying one or more regions of the multiple regions that correspond to fibers, fibrils, or a combination thereof, based on the comparisons; and refining the fiber area, the count of edges, the sum of grey levels, or a combination thereof, based on the identified fibers, the identified fibrils, or a combination thereof.

3. The method of claim 1, further comprising:

performing a Hough transform on the image to distinguish one or more fibers from other elements within the image; and prior to calculating the degree of fibrillation, refining the fiber area based on the one or more distinguished fibers.

4. The method of claim 1, wherein performing the edge detection on the plurality of sub-images comprises, for one or more sub-images of the plurality of sub-images:

generating a sub-image histogram of grey levels based on the sub-image;

determining an average background grey level associated with the sub-image based on the sub-image histogram;

determining a first number of background pixels in a first portion of a peak of the sub-image histogram;

estimating a second number of background pixels in a second portion of the peak of the sub-image histogram; and determining a minimum grey level associated with the sub-image based on the average background grey level, the first number of background pixels, and the second number of background pixels.

5. The method of claim 4, wherein:

the first portion of the peak is to the right of the peak in the sub-image histogram, the second portion of the peak is to the left of the peak in the sub-image histogram, and the second number of background pixels is less than the first number of background pixels.

6. The method of claim 4, wherein performing the edge detection on the plurality of sub-images further comprises: for the one or more sub-images:

for the one or more sub-images:

performing adaptive thresholding on the sub-image based on the minimum grey level associated with the sub-image;

performing binarization on the sub-image to generate a binary sub-image;

applying a low-pass filter to the binary sub-image to generate a filtered binary sub-image;

dilating the filtered binary sub-image to generate a dilated binary sub-image; and subtracting the sub-image from the dilated binary sub-image to generate an edge sub-image;

constructing an edge image based on the edge sub-images;

performing edge detection on the edge image to identify edges of fibrils within the image; and determining a count of edges of the fibrils within the image based on the detected edges of the fibrils.

7. The method of claim 1, wherein performing the morphological image processing on the plurality of sub-images comprises, for each sub-image of the plurality of sub-images:

convolving the sub-image based on an expected fibril width in a vertical direction to generate a vertical convolution sub-image;

convolving the sub-image based on the expected fibril width in a horizontal direction to generate a horizontal convolution sub-image; and determining an average convolution sub-image based on the absolute value of the vertical convolution sub-image and the absolute value of the horizontal convolution sub-image.

8. The method of claim 7, wherein performing the morphological image processing on the plurality of sub-images further comprises:

reconstructing a full convolution image based on the average convolutional sub-image of each of the plurality of sub-images; and determining the sum of grey levels associated with the fibrils within the image based on the full convolution image.

9. The method of claim 8, wherein performing the morphological image processing on the plurality of sub-images further comprises, for each of the plurality of sub-images:

determining local standard deviations of grey levels for multiple regions within the sub-image;

identifying one or more regions of the multiple regions that are associated with a corresponding local standard deviation of grey levels that fail to satisfy a threshold; and masking the identified one or more regions from the average convolution sub-image prior to constructing the full convolution image.

10. The method of claim 1, wherein calculating the degree of fibrillation associated with the pulp comprises:

calculating a first degree of fibrillation based on the fiber area and the count of edges of the fibrils;

calculating a second degree of fibrillation based on the fiber area and the sum of grey levels associated with the fibrils; and calculating the degree of fibrillation based on a weighted average of the first degree of fibrillation and the second degree of fibrillation.

11. The method of claim 10, wherein the first degree of fibrillation indicates a shape factor associated with the fibrils within the image, where the count of edges corresponds to a total perimeter of the fibrils within the image, and where calculating the first degree of fibrillation comprises dividing the total perimeter of the fibrils by a square root of the fiber area.

12. The method of claim 10, wherein the second degree of fibrillation indicates a second shape factor associated with fibrils within the image, and where calculating the second degree of fibrillation comprises:

determining areas of the fibrils within the image based on the sum of grey levels;

determining a total area of the fibrils within the image based on the areas of the fibrils; and dividing the total area of the fibrils by the fiber area.

13. A system for determining a degree of fibrillation within pulp using image processing, the system comprising:

a memory; and one or more processors communicatively coupled to the memory, the one or more processors configured to:

receive image data indicating an image of pulp;

divide the image into a plurality of sub-images;

perform size and shape analysis on the image to determine a fiber area of fibers within the image by performing adaptive thresholding on the image;

perform edge detection on the plurality of sub-images to determine a count of edges of fibrils within the image;

perform morphological image processing on the plurality of sub-images to determine a sum of grey levels associated with the fibrils within the image;

calculate a degree of fibrillation associated with the pulp based at least in part on the fiber area, the count of edges of the fibrils, and the sum of grey levels associated with the fibrils by:

calculating a first degree of fibrillation based on the fiber area and the count of edges of the fibrils;

calculating a second degree of fibrillation based on the fiber area and the sum of grey levels associated with the fibrils; and calculating the degree of fibrillation based on a weighted average of the first degree of fibrillation and the second degree of fibrillation; and initiate display of an output that indicates the degree of fibrillation.

14. The system of claim 13, further comprising an image capture device communicatively coupled to the one or more processors and configured to capture the image.

15. The system of claim 13, wherein the one or more processors are further configured to adaptively adjust one or more parameters associated with the size and shape analysis, the edge detection, the morphological image processing, or a combination thereof, based on a lighting intensity associated with the image, a contrast associated with the image, or a combination thereof.

16. The system of claim 15, wherein, to adaptively adjust the one or more parameters, the one or more processors are further configured to:

generate an image histogram of grey levels based on the image or a sub-image;

determine a peak of the image histogram; and adjust, based on the peak of the image histogram, one or more thresholds used to perform adaptive thresholding on the image or the sub-image.

17. A non-transitory computer-readable storage medium storing instructions that, when executed by one or more processors, cause the one or more processors to perform operations for determining a degree of fibrillation within pulp using image processing, the operations comprising:

receiving image data indicating an image of pulp;

dividing the image into a plurality of sub-images;

performing size and shape analysis on the image to determine a fiber area of fibers within the image by performing adaptive thresholding on the image;

performing edge detection on the plurality of sub-images to determine a count of edges of fibrils within the image;

performing morphological image processing on the plurality of sub-images to determine a sum of grey levels associated with the fibrils within the image;

calculating a degree of fibrillation associated with the pulp based at least in part on the fiber area, the count of edges of the fibrils, and the sum of grey levels associated with the fibrils by:

calculating a first degree of fibrillation based on the fiber area and the count of edges of the fibrils;

calculating a second degree of fibrillation based on the fiber area and the sum of grey levels associated with the fibrils; and calculating the degree of fibrillation based on a weighted average of the first degree of fibrillation and the second degree of fibrillation; and initiating display of an output that indicates the degree of fibrillation.

18. The non-transitory computer-readable storage medium of claim 17, wherein the operations further comprise:

identifying one or more fibers, one or more fibril clusters attached to fibers, one or more free fibril clusters, one or more fibrils attached to fibers, one or more free fibrils, or a combination thereof, based at least in part on the fiber area, the count of edges of the fibrils, and the sum of grey levels associated with the fibrils; and determining lengths, widths, distribution of sizes, or a combination thereof, associated with the one or more fibers, the one or more fibril clusters attached to fibers, the one or more free fibril clusters, the one or more fibrils attached to fibers, the one or more free fibrils, or a combination thereof.

19. The non-transitory computer-readable storage medium of claim 17, wherein calculating the degree of fibrillation comprises:

calculating the first degree of fibrillation by dividing a total fibril perimeter by a square root of the fiber area, the total fibril perimeter based on the count of edges;

calculating the second degree of fibrillation by dividing a total fibril area by the fiber area, the total fibril area based on the sum of grey levels; and calculating the degree of fibrillation based on the first degree of fibrillation and the second degree of fibrillation.

* * * * *